United States Patent
Mavrakis et al.

(10) Patent No.: US 10,842,090 B2
(45) Date of Patent: *Nov. 24, 2020

(54) DRIP EMITTER

(71) Applicant: Rain Bird Corporation, Azusa, CA (US)

(72) Inventors: Rick Mavrakis, Byron Center, MI (US); Brian Pope, Boulder, CO (US); Samir Shah, Chino Hills, CA (US); Christopher Leland O'Neal, Kingman, AZ (US); David R. Laybourn, Claremont, CA (US)

(73) Assignee: Rain Bird Corporation, Azusa, CA (US)

( * ) Notice: Subject to any disclaimer, the term of this patent is extended or adjusted under 35 U.S.C. 154(b) by 214 days.

This patent is subject to a terminal disclaimer.

(21) Appl. No.: 15/665,848

(22) Filed: Aug. 1, 2017

(65) Prior Publication Data

US 2017/0325417 A1 Nov. 16, 2017

Related U.S. Application Data

(60) Continuation of application No. 12/495,193, filed on Jun. 30, 2009, now Pat. No. 9,743,595, which is a
(Continued)

(51) Int. Cl.
*A01G 25/06* (2006.01)
*A01G 25/02* (2006.01)

(52) U.S. Cl.
CPC ............ *A01G 25/06* (2013.01); *A01G 25/023* (2013.01); *Y10T 29/49826* (2015.01)

(58) Field of Classification Search
CPC .. A01G 25/023; A01G 25/06; Y01T 29/49826
See application file for complete search history.

(56) References Cited

U.S. PATENT DOCUMENTS 2,174,515 A 10/1939 Hughes
2,449,731 A 9/1948 Therrien
(Continued)

FOREIGN PATENT DOCUMENTS

AU 511876 10/1978
AU 2004208646 3/2006
(Continued)

OTHER PUBLICATIONS

Alam, M., et al., "Subsurface Drip Irrigation for Alfalfa," Kansas State University, 2009, pp. 1-8.
(Continued)

*Primary Examiner* — Arthur O. Hall
*Assistant Examiner* — Steven M Cernoch
(74) *Attorney, Agent, or Firm* — Fitch, Even, Tabin & Flannery LLP

(57) ABSTRACT

A drip emitter is provided for delivering irrigation water from a supply tube to an emitter outlet at a reduced and relatively constant flow rate. Water enters the emitter through a first inlet and proceeds into a first chamber. When the water pressure is above a predetermined level, a one-directional valve opens to allow fluid flow past the first chamber, through a tortuous path flow channel, and through an emitter outlet. A second inlet is used to compensate for water pressure fluctuations in the supply tube to maintain output flow at a relatively constant rate. Water enters the second inlet and presses a flexible diaphragm toward a water metering surface to provide pressure-dependent control of the output flow. A copper member is mounted to the emitter over the emitter outlet to prevent plant root intrusion into the emitter outlet.

13 Claims, 9 Drawing Sheets

Related U.S. Application Data division of application No. 11/359,181, filed on Feb. 22, 2006, now Pat. No. 7,648,085.

(56) References Cited

U.S. PATENT DOCUMENTS

| | | | |
|---|---|---|---|
| 2,508,403 A | 5/1950 | Knauss | |
| 2,625,429 A | 1/1953 | Coles | |
| 2,639,194 A | 5/1953 | Wahlin | |
| 2,683,061 A | 7/1954 | Shahnazarian | |
| 2,762,397 A | 9/1956 | Miller | |
| 2,794,321 A | 6/1957 | Warner | |
| 2,873,030 A | 2/1959 | Ashton | |
| 2,970,923 A | 2/1961 | Sparmann | |
| 3,004,330 A | 10/1961 | Wilkins | |
| 3,155,612 A | 11/1964 | Weber | |
| 3,182,916 A | 5/1965 | Schulz | |
| 3,199,901 A | 8/1965 | Jeppsson | |
| 3,302,450 A | 2/1967 | Wakar | |
| 3,323,550 A | 6/1967 | Lee | |
| 3,361,359 A | 1/1968 | Chapin | |
| 3,420,064 A | 1/1969 | Blass | |
| 3,426,544 A | 2/1969 | Curtis | |
| 3,434,500 A | 3/1969 | Burrows | |
| 3,467,142 A | 9/1969 | Boyle | |
| 3,586,291 A | 6/1971 | Malec | |
| 3,672,571 A | 6/1972 | Goodricke | |
| 3,693,888 A | 9/1972 | Christy | |
| 3,697,002 A | 10/1972 | Parkison | |
| 3,698,195 A | 10/1972 | Chapin | |
| 3,719,327 A | 3/1973 | Mcmahan | |
| 3,727,635 A | 4/1973 | Todd | |
| 3,729,142 A | 4/1973 | Leal | |
| 3,753,527 A | 8/1973 | Galbraith | |
| 3,777,980 A | 12/1973 | Allport | |
| 3,777,987 A | 12/1973 | Allport | |
| 3,779,468 A | 12/1973 | Spencer | |
| 3,780,946 A | 12/1973 | Bowen | |
| 3,791,587 A | 2/1974 | Drori | |
| 3,792,588 A | 2/1974 | Gilaad | |
| 3,797,741 A | 3/1974 | Spencer | |
| 3,804,334 A | 4/1974 | Curry | |
| 3,807,430 A | 4/1974 | Keller | |
| 3,814,377 A | 6/1974 | Todd | |
| 3,815,636 A | 6/1974 | Menzel | |
| RE28,095 E | 7/1974 | Chapin | |
| 3,830,067 A | 8/1974 | Osborn | |
| 3,833,019 A | 9/1974 | Diggs | |
| 3,851,896 A | 12/1974 | Olson | |
| 3,856,333 A | 12/1974 | Cox | |
| 3,863,845 A | 2/1975 | Bumpstead | |
| 3,866,833 A | 2/1975 | Kojimoto | |
| 3,870,236 A | 3/1975 | Sahagun-Barragan | |
| 3,873,030 A | 3/1975 | Barragan | |
| 3,874,598 A | 4/1975 | Havens | |
| 3,882,892 A | 5/1975 | Menzel | |
| 3,885,743 A | 5/1975 | Wake | |
| 3,895,085 A | 7/1975 | Maruyama | |
| 3,896,999 A | 7/1975 | Barragan | |
| 3,897,009 A | 7/1975 | Rangel-Garza | |
| 3,903,929 A | 9/1975 | Mock | |
| 3,929,258 A * | 12/1975 | Stephens | A01G 25/023 222/1 |
| 3,939,875 A | 2/1976 | Osborn | |
| 3,940,066 A | 2/1976 | Hunter | |
| 3,948,285 A | 4/1976 | Flynn | |
| 3,954,223 A | 5/1976 | Wichman | |
| 3,957,292 A | 5/1976 | Diggs | |
| 3,966,233 A | 6/1976 | Diggs | |
| 3,970,251 A | 7/1976 | Harmony | |
| 3,973,732 A | 8/1976 | Diggs | |
| 3,981,452 A | 9/1976 | Eckstein | |
| 3,993,248 A | 11/1976 | Harmony | |
| 3,995,436 A | 12/1976 | Diggs | |
| 3,998,244 A | 12/1976 | Bentley | |
| 3,998,391 A | 12/1976 | Lemelshtrich | |
| 3,998,427 A | 12/1976 | Bentley | |
| 4,008,853 A | 2/1977 | Tregillus | |
| 4,017,958 A | 4/1977 | Diggs | |
| 4,022,384 A | 5/1977 | Hoyle | |
| 4,036,435 A | 7/1977 | Pecaro | |
| 4,037,791 A | 7/1977 | Mullett | |
| 4,047,995 A | 9/1977 | Leal-Diaz | |
| 4,054,152 A | 10/1977 | Ito | |
| 4,058,257 A | 11/1977 | Spencer | |
| 4,059,228 A | 11/1977 | Werner | |
| 4,077,570 A | 3/1978 | Harmony | |
| 4,077,571 A | 3/1978 | Harmony | |
| 4,084,749 A | 4/1978 | Drori | |
| 4,092,002 A | 5/1978 | Grosse | |
| 4,095,750 A | 6/1978 | Gilead | |
| 4,105,162 A | 8/1978 | Drori | |
| 4,121,771 A | 10/1978 | Hendrickson | |
| 4,122,590 A | 10/1978 | Spencer | |
| 4,128,918 A | 12/1978 | Wenk | |
| 4,132,364 A | 1/1979 | Harmony | |
| 4,134,550 A | 1/1979 | Bright | |
| 4,143,820 A | 3/1979 | Bright | |
| 4,147,307 A | 4/1979 | Christy | |
| 4,160,323 A | 7/1979 | Tracy | |
| 4,161,291 A | 7/1979 | Bentley | |
| 4,177,946 A | 12/1979 | Sahagun-Barragan | |
| 4,177,947 A | 12/1979 | Menzel | |
| 4,196,753 A | 4/1980 | Hammarstedt | |
| 4,196,853 A | 4/1980 | Delmer | |
| 4,209,133 A | 6/1980 | Mehoudar | |
| 4,210,287 A | 7/1980 | Mehoudar | |
| 4,215,822 A | 8/1980 | Mehoudar | |
| 4,223,838 A | 9/1980 | Maria-Vittorio-Torrisi | |
| 4,225,307 A | 9/1980 | Magera | |
| 4,226,368 A | 10/1980 | Hunter | |
| 4,235,380 A | 11/1980 | Delmer | |
| 4,247,051 A | 1/1981 | Allport | |
| 4,250,915 A | 2/1981 | Rikuta | |
| 4,273,286 A | 6/1981 | Menzel | |
| 4,274,597 A | 6/1981 | Dobos | |
| 4,281,798 A | 8/1981 | Lemelstrich | |
| 4,307,841 A | 12/1981 | Mehoudar | |
| 4,331,293 A | 5/1982 | Rangel-Garza | |
| 4,344,576 A | 8/1982 | Smith | |
| 4,354,639 A | 10/1982 | Delmer | |
| 4,366,926 A | 1/1983 | Mehoudar | |
| 4,369,923 A | 1/1983 | Bron | |
| 4,384,680 A | 5/1983 | Mehoudar | |
| 4,385,727 A | 5/1983 | Spencer | |
| 4,385,757 A | 5/1983 | Muller | |
| 4,392,616 A | 7/1983 | Olson | |
| 4,413,786 A | 11/1983 | Mehoudar | |
| 4,413,787 A | 11/1983 | Gilead | |
| 4,423,838 A | 1/1984 | Dinur | |
| 4,424,936 A | 1/1984 | Marc | |
| 4,430,020 A | 2/1984 | Robbins | |
| 4,460,129 A | 7/1984 | Olson | |
| 4,473,191 A | 9/1984 | Chapin | |
| 4,473,525 A | 9/1984 | Drori | |
| 4,502,631 A | 3/1985 | Christen | |
| 4,508,140 A | 4/1985 | Harrison | |
| 4,513,777 A | 4/1985 | Wright | |
| 4,519,546 A | 5/1985 | Gorney | |
| 4,522,339 A | 6/1985 | Costa | |
| 4,533,083 A | 8/1985 | Tucker | |
| 4,534,515 A | 8/1985 | Chapin | |
| 4,545,784 A | 10/1985 | Sanderson | |
| 4,572,756 A | 2/1986 | Chapin | |
| 4,573,640 A | 3/1986 | Mehoudar | |
| 4,593,857 A | 6/1986 | Raz | |
| 4,613,080 A | 9/1986 | Benson | |
| 4,626,130 A | 12/1986 | Chapin | |
| 4,627,903 A | 12/1986 | Chapman | |
| 4,642,152 A | 2/1987 | Chapin | |
| 4,653,695 A | 3/1987 | Eckstein | |
| 4,687,143 A | 8/1987 | Gorney | |
| 4,702,787 A | 10/1987 | Ruskin | |
| 4,718,608 A | 1/1988 | Mehoudar | |
| 4,722,481 A | 2/1988 | Lemkin | |

(56) References Cited

U.S. PATENT DOCUMENTS

| | | |
|---|---|---|
| 4,722,759 A | 2/1988 | Roberts |
| 4,726,520 A | 2/1988 | Brown |
| 4,726,527 A | 2/1988 | Mendenhall |
| 4,728,042 A | 3/1988 | Gorney |
| 4,735,363 A | 4/1988 | Shfaram |
| 4,749,130 A | 6/1988 | Utzinger |
| 4,753,394 A | 6/1988 | Goodman |
| 4,756,339 A | 7/1988 | Buluschek |
| 4,765,541 A | 8/1988 | Mangels |
| 4,775,046 A | 10/1988 | Gramarossa |
| 4,781,217 A | 11/1988 | Rosenberg |
| 4,789,005 A | 12/1988 | Griffiths |
| 4,796,660 A | 1/1989 | Bron |
| 4,807,668 A | 2/1989 | Roberts |
| 4,817,875 A | 4/1989 | Karmeli |
| 4,824,019 A | 4/1989 | Lew |
| 4,824,025 A | 4/1989 | Miller |
| 4,850,531 A | 7/1989 | Littleton |
| 4,854,158 A | 8/1989 | Gates |
| 4,856,552 A | 8/1989 | Hiemstra |
| 4,859,264 A | 8/1989 | Buluschek |
| 4,862,731 A | 9/1989 | Gates |
| 4,874,132 A | 10/1989 | Gilead |
| 4,880,167 A | 11/1989 | Langa |
| 4,900,437 A | 2/1990 | Savall |
| 4,909,411 A | 3/1990 | Uchida |
| 4,935,992 A | 6/1990 | Due |
| 4,948,295 A | 8/1990 | Pramsoler |
| 4,984,739 A | 1/1991 | Allport |
| 4,990,256 A | 2/1991 | Schmidt |
| 5,022,940 A | 6/1991 | Mehoudar |
| 5,031,837 A | 7/1991 | Hanish |
| 5,040,770 A | 8/1991 | Rajster |
| 5,052,625 A | 10/1991 | Ruskin |
| 5,096,206 A | 3/1992 | Andre |
| 5,106,021 A | 4/1992 | Gilead |
| 5,111,995 A | 5/1992 | Dumitrascu |
| 5,111,996 A | 5/1992 | Eckstein |
| 5,116,414 A | 5/1992 | Burton |
| 5,118,042 A | 6/1992 | Delmer |
| 5,118,215 A | 6/1992 | Freier |
| 5,122,044 A | 6/1992 | Mehoudar |
| 5,123,984 A | 6/1992 | Allport |
| 5,137,216 A | 8/1992 | Hanish |
| 5,141,360 A | 8/1992 | Zeman |
| 5,163,622 A | 11/1992 | Cohen |
| 5,181,952 A | 1/1993 | Burton |
| 5,183,208 A | 2/1993 | Cohen |
| 5,192,027 A | 3/1993 | Delmer |
| 5,200,132 A | 4/1993 | Shfaram |
| 5,203,503 A | 4/1993 | Cohen |
| 5,207,386 A | 5/1993 | Mehoudar |
| 5,216,784 A | 6/1993 | Dyer |
| 5,232,159 A | 8/1993 | Abbate |
| 5,232,160 A | 8/1993 | Hendrickson |
| 5,236,130 A | 8/1993 | Hadar |
| 5,246,171 A | 9/1993 | Roberts |
| 5,252,162 A | 10/1993 | Delmer |
| 5,253,807 A | 10/1993 | Newbegin |
| 5,271,786 A | 12/1993 | Gorney |
| 5,279,462 A | 1/1994 | Mehoudar |
| 5,282,578 A | 2/1994 | De Frank |
| 5,282,916 A | 2/1994 | Bloom |
| 5,283,916 A | 2/1994 | Haro |
| 5,294,058 A | 3/1994 | Einav |
| 5,310,438 A | 5/1994 | Ruskin |
| 5,314,116 A | 5/1994 | Krauth |
| 5,316,220 A | 5/1994 | Dinur |
| 5,318,657 A | 6/1994 | Roberts |
| 5,324,371 A | 6/1994 | Mehoudar |
| 5,324,379 A | 6/1994 | Eckstein |
| 5,327,941 A | 7/1994 | Bitsakis |
| 5,330,107 A | 7/1994 | Karathanos |
| 5,332,160 A | 7/1994 | Ruskin |
| 5,333,793 A | 8/1994 | DeFrank |
| 5,337,597 A | 8/1994 | Peake |
| 5,340,027 A | 8/1994 | Yu |
| 5,353,993 A | 10/1994 | Rosenberg |
| 5,364,032 A | 11/1994 | De Frank |
| 5,399,160 A | 3/1995 | Dunberger |
| 5,400,967 A | 3/1995 | Yu |
| 5,400,973 A | 3/1995 | Cohen |
| 5,413,282 A | 5/1995 | Boswell |
| 5,423,501 A | 6/1995 | Yu |
| 5,441,203 A | 8/1995 | Swan |
| 5,442,001 A | 8/1995 | Jones |
| 5,443,212 A | 8/1995 | Dinur |
| 5,449,250 A | 9/1995 | Burton |
| 5,465,905 A | 11/1995 | Elder |
| 5,522,551 A | 6/1996 | DeFrank |
| 5,531,381 A | 7/1996 | Ruttenberg |
| 5,535,778 A | 7/1996 | Zakai |
| 5,584,952 A | 12/1996 | Rubenstein |
| 5,586,727 A | 12/1996 | Shekalim |
| 5,591,293 A | 1/1997 | Miller |
| 5,601,381 A | 2/1997 | Hadar |
| 5,609,303 A | 3/1997 | Cohen |
| 5,615,833 A | 4/1997 | Robillard |
| 5,615,838 A | 4/1997 | Eckstein |
| 5,620,143 A | 4/1997 | Delmer |
| 5,628,462 A | 5/1997 | Miller |
| 5,634,594 A | 6/1997 | Cohen |
| 5,636,797 A | 6/1997 | Cohen |
| 5,641,113 A | 6/1997 | Somaki |
| 5,651,999 A | 7/1997 | Armentrout |
| 5,673,852 A | 10/1997 | Roberts |
| 5,676,897 A | 10/1997 | Dermitzakis |
| 5,695,127 A | 12/1997 | Delmer |
| 5,711,482 A | 1/1998 | Yu |
| 5,722,601 A | 3/1998 | DeFrank |
| 5,727,733 A | 3/1998 | Ruttenberg |
| 5,732,887 A | 3/1998 | Roberts |
| 5,744,423 A | 4/1998 | Voris |
| 5,744,779 A | 4/1998 | Buluschek |
| RE35,857 E | 7/1998 | Mehoudar |
| 5,785,785 A | 7/1998 | Delmer |
| 5,813,603 A | 9/1998 | Kurtz |
| 5,820,028 A | 10/1998 | Dinur |
| 5,820,029 A | 10/1998 | Marans |
| 5,829,685 A | 11/1998 | Cohen |
| 5,829,686 A | 11/1998 | Cohen |
| 5,855,324 A | 1/1999 | DeFrank |
| 5,865,377 A | 2/1999 | DeFrank |
| 5,871,325 A | 2/1999 | Schmidt |
| 5,875,815 A | 3/1999 | Ungerecht |
| 5,898,019 A | 4/1999 | Van Voris |
| 5,944,260 A | 8/1999 | Wang |
| 5,957,391 A | 9/1999 | DeFrank |
| 5,972,375 A | 10/1999 | Truter |
| 5,988,211 A | 11/1999 | Cornell |
| 5,996,909 A | 12/1999 | Lin |
| 6,015,102 A | 1/2000 | Daigle |
| 6,026,850 A | 2/2000 | Newton |
| 6,027,048 A | 2/2000 | Mehoudar |
| 6,039,270 A | 3/2000 | Dermitzakis |
| 6,062,245 A | 5/2000 | Berglind |
| 6,095,185 A | 8/2000 | Rosenberg |
| 6,109,296 A | 8/2000 | Austin |
| 6,116,523 A | 9/2000 | Cabahug |
| 6,120,634 A | 9/2000 | Harrold |
| 6,164,605 A | 12/2000 | Drake |
| 6,179,949 B1 | 1/2001 | Buluschek |
| 6,180,162 B1 | 1/2001 | Shigeru |
| 6,206,305 B1 | 3/2001 | Mehoudar |
| 6,213,408 B1 | 4/2001 | Shekalim |
| 6,238,081 B1 | 5/2001 | Sand |
| 6,250,571 B1 | 6/2001 | Cohen |
| 6,280,554 B1 | 8/2001 | Lambert |
| 6,302,338 B1 | 10/2001 | Cohen |
| 6,308,768 B1 | 10/2001 | Rice |
| 6,308,902 B1 | 10/2001 | Huntley |
| D450,550 S | 11/2001 | Roberts |
| 6,334,958 B1 | 1/2002 | Ruskin |
| 6,343,616 B1 | 2/2002 | Houtchens |

(56) References Cited

U.S. PATENT DOCUMENTS

| | | |
|---|---|---|
| D455,055 S | 4/2002 | Roberts |
| 6,371,390 B1 | 4/2002 | Cohen |
| 6,382,530 B1 | 5/2002 | Perkins |
| 6,394,412 B2 | 5/2002 | Zakai |
| 6,403,013 B1 | 6/2002 | Man |
| 6,449,872 B1 | 9/2002 | Olkku |
| 6,460,786 B1 | 10/2002 | Roberts |
| 6,461,468 B1 | 10/2002 | Cohen |
| 6,461,486 B2 | 10/2002 | Lorincz |
| 6,464,152 B1 | 10/2002 | Bolinis |
| 6,499,687 B2 | 12/2002 | Bryant |
| 6,499,872 B2 | 12/2002 | Sand |
| 6,513,734 B2 | 2/2003 | Bertolotti |
| 6,543,509 B1 | 4/2003 | Harrold |
| 6,557,819 B2 | 5/2003 | Austin |
| 6,561,443 B2 | 5/2003 | Delmer |
| 6,568,607 B2 | 5/2003 | Boswell |
| 6,581,262 B1 | 6/2003 | Myers |
| 6,581,854 B2 | 6/2003 | Eckstein |
| 6,581,902 B2 | 6/2003 | Michau |
| 6,620,278 B1 | 9/2003 | Harrold |
| 6,622,427 B2 | 9/2003 | Breitner |
| 6,622,946 B2 | 9/2003 | Held |
| 6,691,739 B2 | 2/2004 | Rosenberg |
| 6,736,337 B2 | 5/2004 | Vildibill |
| 6,750,760 B2 | 6/2004 | Albritton |
| 6,764,029 B2 | 7/2004 | Rosenberg |
| 6,817,548 B2 | 11/2004 | Krauth |
| 6,821,928 B2 | 11/2004 | Ruskin |
| 6,827,298 B2 | 12/2004 | Sacks |
| 6,830,203 B2 | 12/2004 | Neyestani |
| 6,875,491 B2 | 4/2005 | Miyamoto |
| 6,886,761 B2 | 5/2005 | Cohen |
| 6,894,250 B2 | 5/2005 | Kertscher |
| 6,896,758 B1 | 5/2005 | Giuffre' |
| 6,920,907 B2 | 7/2005 | Harrold |
| 6,933,337 B2 | 8/2005 | Lang |
| 6,936,126 B2 | 8/2005 | DeFrank |
| 6,945,476 B2 | 9/2005 | Giuffre |
| 6,996,932 B2 | 2/2006 | Kruer |
| 6,997,402 B2 | 2/2006 | Kruer |
| 7,007,916 B2 | 3/2006 | Lee |
| 7,048,010 B2 | 5/2006 | Golan |
| 7,108,205 B1 | 9/2006 | Hashimshony |
| 7,175,113 B2 | 2/2007 | Cohen |
| 7,241,825 B2 | 7/2007 | Koga |
| 7,270,280 B2 | 9/2007 | Belford |
| 7,284,302 B2 | 10/2007 | Lares |
| 7,300,004 B2 | 11/2007 | Sinden |
| 7,363,938 B1 | 4/2008 | Newton |
| 7,392,614 B2 | 7/2008 | Kruer |
| 7,410,108 B2 | 8/2008 | Rabinowitz |
| 7,445,021 B2 | 11/2008 | Newton |
| 7,445,168 B2 | 11/2008 | Ruskin |
| 7,455,094 B2 | 11/2008 | Lee |
| 7,506,658 B2 | 3/2009 | Guest |
| 7,530,382 B2 | 5/2009 | Kertscher |
| 7,648,085 B2 | 1/2010 | Mavrakis |
| 7,681,805 B2 | 3/2010 | Belford |
| 7,681,810 B2 | 3/2010 | Keren |
| 7,695,587 B2 | 4/2010 | Kertscher |
| 7,712,253 B2 | 5/2010 | Gesser |
| 7,735,758 B2 | 6/2010 | Cohen |
| 7,748,930 B2 | 7/2010 | Gesser |
| 7,775,237 B2 | 8/2010 | Keren |
| 7,802,592 B2 | 9/2010 | McCarty |
| 7,887,664 B1 | 2/2011 | Mata |
| 7,900,656 B2 | 3/2011 | Masarwa |
| 7,913,935 B2 | 3/2011 | Einav |
| 7,954,732 B2 | 6/2011 | Shekalim |
| 7,988,076 B2 | 8/2011 | Mamo |
| 7,989,076 B2 | 8/2011 | Li |
| 8,002,496 B2 | 8/2011 | Giuffre |
| 8,011,852 B2 | 9/2011 | Gesser |
| 8,033,300 B2 | 10/2011 | McCarty |
| D648,191 S | 11/2011 | Thayer |
| 8,051,871 B2 | 11/2011 | Shani |
| 8,079,385 B2 | 12/2011 | Hatton |
| 8,091,276 B2 | 1/2012 | Gesser |
| 8,091,800 B2 | 1/2012 | Retter |
| 8,096,491 B2 | 1/2012 | Lutzki |
| 8,136,246 B2 | 3/2012 | So |
| 8,141,589 B2 | 3/2012 | Socolsky |
| D657,638 S | 4/2012 | Einav |
| 8,220,727 B2 | 7/2012 | Lee |
| 8,267,115 B2 | 9/2012 | Giuffre' |
| 8,286,667 B2 | 10/2012 | Ruskin |
| 8,302,887 B2 | 11/2012 | Park |
| 8,317,111 B2 | 11/2012 | Cohen |
| 8,372,326 B2 | 2/2013 | Mamo |
| 8,381,437 B2 | 2/2013 | Ciudaj |
| 8,439,282 B2 | 5/2013 | Allen |
| 8,454,786 B2 | 6/2013 | Guichard |
| 8,469,294 B2 | 6/2013 | Mata |
| 8,475,617 B2 | 7/2013 | Kertscher |
| 8,511,585 B2 | 8/2013 | Keren |
| 8,511,586 B2 | 8/2013 | Einav |
| 8,584,398 B2 | 11/2013 | Gesser |
| 8,628,032 B2 | 1/2014 | Feith |
| 8,663,525 B2 | 3/2014 | Mamo |
| 8,689,484 B2 | 4/2014 | Ruskin |
| 8,714,181 B2 | 5/2014 | Shani |
| 8,714,205 B2 | 5/2014 | Loebinger |
| 8,763,934 B2 | 7/2014 | Patel |
| 8,770,888 B2 | 7/2014 | Helbig |
| 8,870,098 B2 | 10/2014 | Lutzki |
| 8,882,004 B2 | 11/2014 | Gorney |
| 8,998,112 B2 | 4/2015 | Cohen |
| 8,998,113 B2 | 4/2015 | Keren |
| 9,022,059 B2 | 5/2015 | Cohen |
| 9,022,764 B2 | 5/2015 | Wisler |
| 9,027,856 B2 | 5/2015 | DeFrank |
| D740,940 S | 10/2015 | Fregoso |
| 9,192,108 B2 | 11/2015 | Kertscher |
| 9,253,950 B1 | 2/2016 | Clark |
| 9,253,951 B2 | 2/2016 | Herrera |
| 9,258,949 B2 | 2/2016 | Nourian |
| 9,258,950 B2 | 2/2016 | Kidachi |
| 9,291,276 B2 | 3/2016 | Keren |
| 9,345,205 B2 | 5/2016 | Kidachi |
| 9,380,749 B2 | 7/2016 | Akritanakis |
| 9,386,752 B2 | 7/2016 | Einav |
| 9,433,157 B2 | 9/2016 | Dermitzakis |
| 9,439,366 B2 | 9/2016 | Kidachi |
| 9,485,923 B2 | 11/2016 | Ensworth |
| D781,115 S | 3/2017 | Einav |
| 9,695,965 B2 | 7/2017 | Hadas |
| 9,814,189 B1 | 11/2017 | Clark |
| 9,872,444 B2 | 1/2018 | Turk |
| 9,877,440 B2 | 1/2018 | Ensworth |
| 9,877,441 B2 | 1/2018 | Ensworth |
| 9,877,442 B2 | 1/2018 | Kim |
| D811,179 S | 2/2018 | Ensworth |
| 9,894,851 B2 | 2/2018 | Desarzens |
| 9,949,448 B2 | 4/2018 | Cohen |
| D816,439 S | 5/2018 | Crook |
| 10,010,030 B2 | 7/2018 | Motha |
| 10,034,439 B2 | 7/2018 | Kidachi |
| D826,662 S | 8/2018 | Ensworth |
| 10,070,595 B2 | 9/2018 | Loebinger |
| 10,085,391 B2 | 10/2018 | Haub |
| 10,107,707 B2 | 10/2018 | Defrank |
| 10,172,302 B2 | 1/2019 | Keren |
| 10,212,896 B2 | 2/2019 | Kidachi |
| 10,271,484 B2 | 4/2019 | Einav |
| 10,299,444 B2 | 5/2019 | Cohen |
| 10,349,587 B2 | 7/2019 | Einav |
| 10,375,904 B2 | 8/2019 | Ensworth |
| 10,455,780 B2 | 10/2019 | Cohen |
| 10,462,983 B2 | 11/2019 | Socolsky |
| 2002/0064935 A1 | 5/2002 | Honda |
| 2002/0070297 A1 | 6/2002 | Bolinis |
| 2002/0074434 A1 | 6/2002 | Delmer |
| 2002/0088877 A1 | 7/2002 | Bertolotti |

(56) References Cited

U.S. PATENT DOCUMENTS

| | | |
|---|---|---|
| 2002/0104902 A1 | 8/2002 | Eckstein |
| 2002/0104903 A1 | 8/2002 | Eckstein |
| 2002/0113147 A1 | 8/2002 | Huntley |
| 2003/0029937 A1 | 2/2003 | Dermitzakis |
| 2003/0042335 A1 | 3/2003 | Krauth |
| 2003/0050372 A1 | 3/2003 | Stanhope |
| 2003/0057301 A1 | 3/2003 | Cohen |
| 2003/0089409 A1 | 5/2003 | Morimoto |
| 2003/0089803 A1 | 5/2003 | Huntley |
| 2003/0090369 A1 | 5/2003 | Albritton |
| 2003/0092808 A1 | 5/2003 | Stanhope |
| 2003/0140977 A1 | 7/2003 | Berton |
| 2003/0150940 A1 | 8/2003 | Vildibill |
| 2003/0226913 A1 | 12/2003 | Brunnengraeber |
| 2004/0018263 A1 | 1/2004 | Hashimshony |
| 2004/0164185 A1 | 8/2004 | Giuffre |
| 2005/0029231 A1 | 2/2005 | Kertscher |
| 2005/0077396 A1 | 4/2005 | Rabinowitz |
| 2005/0103409 A1 | 5/2005 | Weber |
| 2005/0133613 A1 | 6/2005 | Mayer |
| 2005/0224607 A1 | 10/2005 | Dinur |
| 2005/0224962 A1 | 10/2005 | Akamatsu |
| 2005/0258278 A1 | 11/2005 | Cohen |
| 2005/0258279 A1 | 11/2005 | Harrold |
| 2005/0279856 A1 | 12/2005 | Nalbandian |
| 2005/0279866 A1 | 12/2005 | Belford |
| 2005/0284966 A1 | 12/2005 | DeFrank |
| 2006/0032949 A1 | 2/2006 | Lo |
| 2006/0043219 A1 | 3/2006 | Raanan |
| 2006/0144965 A1 | 7/2006 | Keren |
| 2006/0163388 A1 | 7/2006 | Mari |
| 2006/0169805 A1 | 8/2006 | Dabir |
| 2006/0186228 A1 | 8/2006 | Belford |
| 2006/0202381 A1 | 9/2006 | Bach |
| 2006/0237561 A1 | 10/2006 | Park |
| 2006/0255186 A1 | 11/2006 | Ruskin |
| 2007/0095950 A1 | 5/2007 | Kim |
| 2007/0108318 A1 | 5/2007 | Mamo |
| 2007/0138323 A1 | 6/2007 | Lee |
| 2007/0175580 A1 | 8/2007 | Mata |
| 2007/0187031 A1 | 8/2007 | Kertscher |
| 2007/0194149 A1 | 8/2007 | Mavrakis |
| 2008/0041978 A1 | 2/2008 | Keren |
| 2008/0067266 A1 | 3/2008 | Cohen |
| 2008/0099584 A1 | 5/2008 | Raanan |
| 2008/0105768 A1 | 5/2008 | Kertscher |
| 2008/0190256 A1 | 8/2008 | So |
| 2008/0237374 A1 | 10/2008 | Belford |
| 2008/0257991 A1 | 10/2008 | Einav |
| 2008/0265064 A1 | 10/2008 | Keren |
| 2009/0020634 A1 | 1/2009 | Schweitzer |
| 2009/0065084 A1 | 3/2009 | Masarwa |
| 2009/0145985 A1 | 6/2009 | Mayer |
| 2009/0159726 A1 | 6/2009 | Thompson |
| 2009/0165879 A1 | 7/2009 | Socolsky |
| 2009/0173811 A1 | 7/2009 | Gorney |
| 2009/0243146 A1 | 10/2009 | Retter |
| 2009/0261183 A1 | 10/2009 | Mavrakis |
| 2009/0266919 A1 | 10/2009 | Mavrakis |
| 2009/0283613 A1 | 11/2009 | Barkai |
| 2009/0302127 A1 | 12/2009 | Lutzki |
| 2009/0314377 A1 | 12/2009 | Giuffre |
| 2009/0320932 A1 | 12/2009 | Giuffre |
| 2010/0000674 A1 | 1/2010 | Voigtmann |
| 2010/0023717 A1 | 1/2010 | Jinno |
| 2010/0096478 A1 | 4/2010 | Mamo |
| 2010/0096479 A1 | 4/2010 | Mamo |
| 2010/0108785 A1 | 5/2010 | Lee |
| 2010/0126974 A1 | 5/2010 | Kertscher |
| 2010/0155508 A1 | 6/2010 | Keren |
| 2010/0163651 A1 | 7/2010 | Feith |
| 2010/0175408 A1 | 7/2010 | Korda |
| 2010/0219265 A1 | 9/2010 | Feld |
| 2010/0237170 A1 | 9/2010 | Rosenberg |
| 2010/0244315 A1 | 9/2010 | Mamo |
| 2010/0252126 A1 | 10/2010 | Roes |
| 2010/0252127 A1 | 10/2010 | Gross |
| 2010/0282873 A1 | 11/2010 | Mattlin |
| 2010/0319784 A1 | 12/2010 | Kuhne |
| 2011/0186652 A1 | 8/2011 | Cohen |
| 2011/0226354 A1 | 9/2011 | Thordarson |
| 2012/0012678 A1 | 1/2012 | Gregory |
| 2012/0012682 A1 | 1/2012 | Einav |
| 2012/0074345 A1 | 3/2012 | Hatton |
| 2012/0097196 A1 | 4/2012 | Cohen |
| 2012/0097254 A1 | 4/2012 | Cohen |
| 2012/0097769 A1 | 4/2012 | Zavoli |
| 2012/0104648 A1 | 5/2012 | Yiflach |
| 2012/0126036 A1 | 5/2012 | Patel |
| 2012/0180875 A1 | 7/2012 | Keller |
| 2012/0199673 A1 | 8/2012 | Cohen |
| 2012/0256017 A1 | 10/2012 | Gorney |
| 2012/0267454 A1 | 10/2012 | Einav |
| 2012/0305676 A1 | 12/2012 | Keren |
| 2013/0181066 A1 | 7/2013 | Dermitzakis |
| 2013/0248616 A1 | 9/2013 | Ensworth |
| 2013/0248622 A1 | 9/2013 | Kim |
| 2013/0341431 A1 | 12/2013 | Ensworth |
| 2014/0027539 A1 | 1/2014 | Kim |
| 2014/0034753 A1 | 2/2014 | Mavrakis |
| 2014/0110506 A1 | 4/2014 | Mavrakis |
| 2014/0246520 A1 | 9/2014 | Einav |
| 2014/0263758 A1 | 9/2014 | Turk |
| 2015/0014446 A1 | 1/2015 | Cohen |
| 2015/0041563 A1 | 2/2015 | Ensworth |
| 2015/0041564 A1 | 2/2015 | Ensworth |
| 2015/0090815 A1 | 4/2015 | Akritanakis |
| 2015/0090816 A1 | 4/2015 | Akritanakis |
| 2015/0107777 A1 | 4/2015 | Zakarian |
| 2015/0144717 A1 | 5/2015 | Turk |
| 2015/0181816 A1 | 7/2015 | Desarzens |
| 2015/0181820 A1 | 7/2015 | Crook |
| 2015/0201568 A1 | 7/2015 | Einav |
| 2015/0223414 A1 | 8/2015 | Kidachi |
| 2015/0250111 A1 | 9/2015 | Kidachi |
| 2015/0296723 A1 | 10/2015 | Jain |
| 2015/0319940 A1 | 11/2015 | Kidachi |
| 2015/0351333 A1 | 12/2015 | Eberle |
| 2016/0057947 A1 | 3/2016 | Ensworth |
| 2016/0075070 A1 | 3/2016 | Verelis |
| 2016/0076965 A1 | 3/2016 | Edris |
| 2016/0088806 A1 | 3/2016 | Haub |
| 2016/0095285 A1 | 4/2016 | Loebinger |
| 2016/0198643 A1 | 7/2016 | Cohen |
| 2016/0219802 A1 | 8/2016 | Ensworth |
| 2016/0219803 A1 | 8/2016 | Keren |
| 2016/0223092 A1 | 8/2016 | Hadas |
| 2016/0278311 A1 | 9/2016 | Kidachi |
| 2016/0286741 A1 | 10/2016 | Kidachi |
| 2016/0286743 A1 | 10/2016 | Einav |
| 2016/0309669 A1 | 10/2016 | Kidachi |
| 2016/0330917 A1 | 11/2016 | Kidachi |
| 2017/0035005 A1 | 2/2017 | Kidachi |
| 2017/0035006 A1 | 2/2017 | Kim |
| 2017/0112078 A1 | 4/2017 | Ensworth |
| 2017/0118927 A1 | 5/2017 | Loebinger |
| 2017/0142916 A1 | 5/2017 | Shamshery |
| 2017/0205013 A1 | 7/2017 | Smith |
| 2017/0290277 A1 | 10/2017 | Cohen |
| 2017/0292646 A1 | 10/2017 | Hadas |
| 2018/0014477 A1 | 1/2018 | Ensworth |
| 2018/0027756 A1 | 2/2018 | Kidachi |
| 2018/0098514 A1 | 4/2018 | Socolsky |
| 2018/0110191 A1 | 4/2018 | Keren |
| 2018/0116134 A1 | 5/2018 | Ensworth |
| 2018/0168116 A1 | 6/2018 | Morikoshi |
| 2018/0168117 A1 | 6/2018 | Noguchi |
| 2018/0177145 A1 | 6/2018 | Morikoshi |
| 2018/0199524 A1 | 7/2018 | Socolsky |
| 2018/0228097 A1 | 8/2018 | Alkalay |
| 2018/0266576 A1 | 9/2018 | Balet |
| 2018/0317406 A1 | 11/2018 | Tsouri |
| 2018/0328498 A1 | 11/2018 | Rulli |
| 2018/0338434 A1 | 11/2018 | Wlassich |

(56) References Cited

U.S. PATENT DOCUMENTS

| | | |
|---|---|---|
| 2018/0359962 A1 | 12/2018 | Noguchi |
| 2019/0246577 A1 | 8/2019 | Masarwa |
| 2019/0246578 A1 | 8/2019 | Einav |
| 2019/0335687 A1 | 11/2019 | Socolsky |

FOREIGN PATENT DOCUMENTS

| | | | |
|---|---|---|---|
| CA | 1053726 | | 5/1979 |
| CN | 1627994 | | 6/2005 |
| CN | 102057823 | | 5/2011 |
| CN | 201821716 | | 5/2011 |
| CN | 201871438 | | 6/2011 |
| CN | 202617872 | | 12/2012 |
| CN | 102933071 | | 2/2013 |
| DE | 112706 | | 5/1975 |
| DE | 3525591 | | 1/1986 |
| EP | 0160299 | A2 | 11/1985 |
| EP | 0344605 | A2 | 12/1989 |
| EP | 0353982 | | 2/1990 |
| EP | 0444425 | A1 | 9/1991 |
| EP | 0480632 | A2 | 4/1992 |
| EP | 0491115 | A1 | 6/1992 |
| EP | 0549515 | A1 | 6/1993 |
| EP | 636309 | A1 | 2/1995 |
| EP | 0709020 | A1 | 5/1996 |
| EP | 0730822 | A2 | 9/1996 |
| EP | 493299 | | 5/1997 |
| EP | 0872172 | A1 | 10/1998 |
| EP | 1541013 | A2 | 6/2005 |
| EP | 1701147 | | 9/2006 |
| EP | 2952091 | A1 | 12/2015 |
| FR | 2366790 | | 5/1978 |
| GB | 1498545 | | 1/1978 |
| GB | 2057960 | A | 4/1981 |
| IL | 42705 | A | 3/1976 |
| IL | 53463 | A | 3/1983 |
| IL | 97564 | A | 7/1996 |
| IL | 221089 | | 5/2016 |
| IL | 212105 | | 7/2016 |
| IT | 1255120 | | 10/1995 |
| JP | 2000228417 | | 8/2000 |
| JP | 2016220620 | | 12/2016 |
| JP | 2016220620 | A | 12/2016 |
| RU | 2240682 | | 1/2005 |
| RU | 2275791 | | 3/2006 |
| RU | 2415565 | | 4/2011 |
| WO | 9205689 | A1 | 4/1992 |
| WO | 9221228 | A1 | 12/1992 |
| WO | 9427728 | A1 | 12/1994 |
| WO | 1995029761 | | 11/1995 |
| WO | 9614939 | | 5/1996 |
| WO | 9810635 | A1 | 3/1998 |
| WO | 9902273 | A1 | 1/1999 |
| WO | 9918771 | A1 | 4/1999 |
| WO | 9955141 | A1 | 11/1999 |
| WO | 0001219 | A1 | 1/2000 |
| WO | 0010378 | A1 | 3/2000 |
| WO | 030760 | | 6/2000 |
| WO | 136106 | A1 | 5/2001 |
| WO | 0156768 | A1 | 8/2001 |
| WO | 2001064019 | | 9/2001 |
| WO | 0204130 | A1 | 1/2002 |
| WO | 2002015670 | | 2/2002 |
| WO | 2003045577 | A1 | 6/2003 |
| WO | 2003066228 | A1 | 8/2003 |
| WO | 2004028778 | A1 | 4/2004 |
| WO | 2007046105 | | 10/2005 |
| WO | 2006030419 | A2 | 3/2006 |
| WO | 2006038246 | | 4/2006 |
| WO | 2007068523 | A1 | 6/2007 |
| WO | 2010022471 | | 3/2010 |
| WO | 2010048063 | | 4/2010 |
| WO | 2011092557 | | 8/2011 |
| WO | 2011101842 | | 8/2011 |
| WO | 2012015655 | A1 | 2/2012 |
| WO | 2012137200 | | 10/2012 |
| WO | 2012160121 | | 11/2012 |
| WO | 2013148672 | | 10/2013 |
| WO | 2013155173 | A2 | 10/2013 |
| WO | 2013192321 | | 12/2013 |
| WO | 2014016832 | | 1/2014 |
| WO | 2015023624 | | 2/2015 |
| WO | 2015044801 | | 4/2015 |
| WO | 2015052107 | | 4/2015 |
| WO | 2015098412 | | 7/2015 |
| WO | 2016156814 | | 10/2016 |
| WO | 2018078521 | | 5/2018 |

OTHER PUBLICATIONS

Alapati, Nanda K., Netafim Letter dated Mar. 30, 2012 with enclosure and attachments, 13 pages.
Alapati, Nanda K., Netafim Letter dated Mar. 30, 2012 with enclosure, 6 pages.
Arduini, I., et al., "Influence of Copper on Root Growth and Morphology of *Pinus pinea* L. and *Pinus pinaster* Ait. Seedlings," Tree Physiology, 15, 1995, pp. 411-415.
Bernard, H., et al., "Assessment of herbicide leaching risk in two tropical soils of Reunion Island (France)," J Environ Qual 34:534-543, (2005).
Beverage, K., "Drip Irrigation for Row Crops," New Mexico State University, 2001, pp. 1-43.
Borkow, G., et al., "A Novel Anti-Influenza Copper Oxide Containing Respiratory Face Mask," PLoS ONE, www.plosone.org, Jun. 2010, vol. 5, Issue 6, pp. 1-8.
Borkow, G., et al., "Copper as a Biocidal Tool," Current Medicinal Chemistry, 2005, 12, 2163-2175.
Borkow, G., et al., "Endowing Textiles with Permanent Potent Biocidal Properties by Impregnating Them with Copper Oxide," ResearchGate, Jan. 2006.
Borkow, G., et al., "Putting copper into action:copperimpregnated products with potent biocidal activities," FASEB J, 18:1728-1730, (2004).
Coder, K., "Tree Root Growth Control Series: Root Control Barriers," The University of Georgia, Mar. 1998, pp. 1-7.
Crawford, M., "Copper-Coated Containers and Their Impact on the Environment," Spin Out, 2003, pp. 76-78.
Crawford, M., "Update on Copper Root Control," Spin Out, 1997.
Diver, S., et al., "Sustainable Small-Scale Nursery Production," ATTRA, Nov. 2001, pp. 1-31.
Duke, K., et al., "Sewer Line Chemical Root Control with Emphasis on Foaming Methods Using Metam-Sodium and Dichiobenil," EPA United States Environmental Protection Agency, Sep. 1995.
Eason, Audra, et al., "Integrated modeling environment for statewide assessment of groundwater vulnerability from pesticide use in agriculture," Pest Manag Sci, 60:739-745 (online:2004).
European Patent Office, Communication Pursuant to Article 94(3) EPC issued in European Application No. 14 836 360.9, dated Feb. 8, 2017, 7 pp.
European Patent Office, Extended European Search Report for European Application No. 13770084.5 dated Feb. 11, 2016, 7 pages.
European Patent Office, Extended European Search Report issued in Application No. 13768209.2, dated Nov. 24, 2015, 10 pp.
European Patent Office, Office Action for European Application No. 10160675.4 dated Mar. 27, 2012, 2 pp.
European Patent Office, Search Report for European Application No. 10160675.4 dated Aug. 6, 2010, 2 pp.
Final Office Action dated Aug. 25, 2015; U.S. Appl. No. 13/430,308; 11 pages.
Final Office Action dated Jul. 21, 2016; U.S. Appl. No. 13/430,308; 9 pages.
Fitch, Even, Tabin & Flannery; Letter, Apr. 23, 2008, 1 p.
Giles-Parker, C, EPA, Pesticide Fact Sheet, pp. 1-4.
http://aasystems.eu/products11.html; Advanced Automation Systems Ltd. (1 p., dated Jun. 20, 2013).
http://metzerplas.com/en-US/50/845/; Meterplas Cooperative Agricultural Organization Ltd., (2 pp., dated Jun. 20, 2013).

(56) References Cited

OTHER PUBLICATIONS

Jaffe, E., Netafim Ltd., Patent Dept., Letter with attached Appendices A-B, Aug. 1, 2010, 35 pages.
Jaffe, E., Netafim Ltd., Patent Dept., Letter with attached claim charts, Feb. 4, 2008, 6 pages.
Jaffe, E., Netafim Ltd., Patent Dept., Letter with attached claim charts, Jul. 12, 2009, 4 pages.
Jaffe, E., Netafim Ltd., Patent Dept., Letter with attachment, Feb. 4, 2008, 7 pages.
Jaffe, E., Netafim, Ltd., Patent Dept., Letter with attached invoice, May 7, 2008, 2 pages.
Jiang, W. et al., "Effects of Copper on Root Growth, Cell Division, and Nucleolus of Zea mays," Biologia Plantarum, 44(1), 2001, pp. 105-109.
Kuhns, L. et al., "Copper Toxicity in Woody Ornamentals," Journal of Arboriculture, Apr. 1976. pp. 68-78.
Mastin, B.J., et al., "Toxicity and bioavailability of copper herbicides (Clearigate, Cutrine-Plus, and copper sulfate) to freshwater animals," Arch Environ Contam Toxicol, 39:445-451, (2000).
Murray-Gulde, C.L., et al., "Algicidal effectiveness of Clearigate, Cutrine-Plus, and copper sulfate and margins of safety associated with their use," Arch Environ Contam Toxicol 42:19-27, (2002).
Netafim International—Netafim USA—Internet site, 2003, 5 pages.
Netafim Ltd., Appendix A, images of Netafim's Drip Net product, 1 page.
Netafim Ltd., Appendix A, marked-up images of Netafim's Ram product, 1 page.
Netafim Ltd., Appendix B, Invoice, Jan. 31, 1991, 1 page.
Netafim Ltd., Appendix C, Netafim RAM Catalog, Jan. 2000, 4 pages.
Netafim Ltd., Appendix D, Englarged, marked-up excerpts from Netafim RAM Catalog, Jan. 2000, 1 page.
Netafim USA, RAM Catalog Figures, Jan. 2000, 4 pages.
Netafim USA, Triton X Heavywall Dripperline Catalog, May 2007, 8 pages.
Non-Final Office Action ated Feb. 11, 2016; U.S. Appl. No. 13/430,308; 9 pages.
Patent Cooperation Treaty, Application No. PCT/US2013/033866, International Search Report and Written Opinion dated Jun. 19, 2013, 38 pp.
Patent Cooperation Treaty, International Search Report issued in International Application No. PCT/US2013/046603, dated Sep. 19, 2013, 2 pp.
Patent Cooperation Treaty, International Searching Authority, Notification of Transmittal of the International Search Report and the Written Opinion of the International Searching Authority, or the Declaration, issued in International Application No. PCT/US/2014/054533, dated Dec. 25, 2014, 9 pp.
Patent Cooperation Treaty, Notification of Transmittal of the International Search Report and the Written Opinion of the International Searching Authority issued in International Application No. PCT/US2013/033668, dated Jun. 17, 2013, 10 pp.
Patent Cooperation Treaty, Notification of Transmittal of the International Search Report and the Written Opinion of the International Searching Authority issued in International Application No. PCT/US2014/050623, dated Nov. 20, 2014, 17 pp.
Patent Cooperation Treaty, Notification of Transmittal of the International Search Report and the Written Opinion of the International Searching Authority, or the Declaration, Issued in International Application No. PCT/US2017042378, dated Oct. 26, 2017, 7 pp.
Patent Cooperation Treaty, Written Opinion of the International Searching Authority issued in International Application No. PCT/US2013/046603, dated Sep. 19, 2013, 4 pp.
PCT International Application No. PCT/US2013/033866 filed Mar. 26, 2013.
Rain Bird Corporation, Agriculture Irrigation Equipment 1981 Catalog, 3 pages.
Rain Bird Corporation, Drip Watering System 1994 Catalog, 1993, 16 pages.
Rain Bird Corporation, Landscape Irrigation Products 1993-1994 Catalog, Feb. 1993, 5 pages.
Rain Bird Corporation, Landscape Irrigation Products 1993-1994 Catalog, p. 120, Feb. 1993, 3 pages.
Rain Bird Corporation, Landscape Irrigation Products 2001-2002 Catalog, Mar. 2001, 9 pages.
Rain Bird Corporation, Landscape Irrigation Products 2001-2002 Catalog, pp. 181-184, Mar. 2001, 6 pages.
Rain Bird Corporation, Landscape Irrigation Products 2005-2006 Catalog, Jun. 2004, 13 pages.
Rain Bird Corporation, Landscape Irrigation Products 2005-2006 Catalog, pp. 230-232; 247-250, Jun. 2004, 10 pages.
Rain Bird Corporation, Landscape Irrigation Products 2006-2007 Catalog, p. 222-224; 238-242, Jul. 2005, 11 pages.
Rain Bird Corporation, Nursery Equipment Catalog 1986/1987, 1986, 3 pages.
Rain Bird Corporation, PC Dripline Pressure Compensating Inline Emitter Tubing Catalog, Oct. 1998, 16 pages.
Rain Bird Corporation, Turf Irrigation Equipment 1982 Catalog, 1982, 4 pages.
Rain Bird Corporation, Turf Irrigation Equipment 1983 Catalog, 1983, 4 pages.
Rain Bird Corporation, Turf Irrigation Equipment 1985 Catalog, 1985, 3 pages.
Rain Bird Corporation, Turf Irrigation Equipment 1985 Catalog, p. 73, 1985, 3 pages.
Rain Bird Corporation, Turf Irrigation Equipment 1987 Catalog, 1987, 6 pages.
RAM Invoice Jan. 31, 1991.
Schifris, Seba et al., "Inhibition of root penetration in subsurface driplines by impregnating the drippers with copper oxide particles," Irrigation Science (2015) 33:4, pp. 319-324.
Smiley, E. T., "Root Growth Near Vertical Root Barriers," International Society of Arboriculture, 1995, pp. 150-152.
Spera, G., et al., "Subsurface drip irrigation with microencapsulated trifluralin. Trifluralin residues in soils and cultivations," Commun Agric Appl Biol Sci 71:161-170, (2006).
State Intellectual Property Office, First Office Action issued in Chinese Application No. 201380016629.9, dated Nov. 4, 2015, 16 pp.
The Clean Estuary Partnership, "Copper Sources in Urban Runoff and Shoreline Activities," TDC Environmental, LLC, 2004, pp. 1-72.
U.S. Appl. No. 11/359,181, filed Feb. 22, 2006, entitled "Drip Emitter," and issued on Jan. 19, 2010 as U.S. Pat. No. 7,648,085.
U.S. Appl. No. 11/394,755, filed Mar. 31, 2006, entitled "Drip Emitter.".
U.S. Appl. No. 12/347,266, filed Dec. 31, 2008, entitled "Low Flow Irrigation Emitter.".
U.S. Appl. No. 12/367,295, filed Feb. 6, 2009, entitled "Low Flow Irrigation Emitter.".
U.S. Appl. No. 12/436,394, filed May 6, 2009, entitled "Drip Emitter and Methods of Assembly and Mounting.".
U.S. Appl. No. 12/495,178, filed Jun. 30, 2009, entitled "Drip Emitter.".
U.S. Appl. No. 12/495,193, filed Jun. 30, 2009, entitled "Drip Emitter," which is a continuation of U.S. Appl. No. 11/359,181.
U.S. Appl. No. 13/430,249, filed Mar. 26, 2012.
U.S. Appl. No. 13/964,903, filed Aug. 12, 2013.
U.S. Appl. No. 14/139,217, filed Dec. 23, 2013.
USPTO; U.S. Appl. No. 14/036,881; Notice of Allowance dated Aug. 24, 2017; (pp. 1-7).
USPTO; U.S. Appl. No. 13/839,726; Notice of Allowance dated Sep. 14, 2017; (pp. 1-5).
USPTO; U.S. Appl. No. 13/964,903; Notice of Allowance dated Aug. 4, 2017; (pp. 1-11).
USPTO; U.S. Appl. No. 13/964,903; Notice of Allowance dated Sep. 18, 2017; (pp. 1-7).
USPTO; U.S. Appl. No. 14/036,881; Corrected Notice of Allowability dated May 22, 2017.
USPTO; U.S. Appl. No. 14/036,881; Notice of Allowability dated Nov. 29, 2017; (pp. 1-2).

(56) References Cited

OTHER PUBLICATIONS

USPTO; U.S. Appl. No. 14/036,881; Notice of Allowability dated Dec. 26, 2017; (pp. 1-2).
USPTO; U.S. Appl. No. 14/036,881; Notice of Allowance dated May 8, 2017.
USPTO; U.S. Appl. No. 14/036,881; Notice of Allowance dated Dec. 23, 2016.
USPTO; U.S. Appl. No. 14/036,881; Office Action dated Aug. 2, 2016.
USPTO; U.S. Appl. No. 14/036,881; Office Action dated Dec. 9, 2015.
USPTO; U.S. Appl. No. 14/385,564; Notice of Allowability dated Nov. 29, 2017; (pp. 1-2).
USPTO; U.S. Appl. No. 14/385,564; Notice of Allowability dated Dec. 26, 2017; (pp. 1-2).
USPTO; U.S. Appl. No. 14/385,564; Notice of Allowance dated Aug. 22, 2017; (pp. 1-8).
USPTO; U.S. Appl. No. 14/475,435; Office Action dated Sep. 27, 2017; (pp. 1-9).
USPTO; U.S. Appl. No. 14/518,774; Notice of Allowance dated Jan. 4, 2018; (pp. 1-4).
USPTO; U.S. Appl. No. 14/518,774; Notice of Allowance dated Oct. 26, 2017; (pp. 1-7).
USPTO; U.S. Appl. No. 14/851,545; Office Action dated Oct. 30, 2017; (pp. 1-27).
USPTO; U.S. Appl. No. 15/331,407; Corrected Notice of Allowability dated Dec. 28, 2017; (pp. 1-2).
USPTO; U.S. Appl. No. 15/331,407; Notice of Allowability dated Nov. 30, 2017; (pp. 1-2).
USPTO; U.S. Appl. No. 15/331,407; Notice of Allowance dated Oct. 27, 2017; (pp. 1-9).
USPTO; U.S. Appl. No. 15/331,407; Office Action dated Apr. 27, 2017.
USPTO; U.S. Appl. No. 15/344,843; Corrected Notice of Allowability dated Dec. 28, 2017; (pp. 1-2).
USPTO; U.S. Appl. No. 15/344,843; Notice of Allowability dated Nov. 30, 2017; (pp. 1-2).
USPTO; U.S. Appl. No. 15/344,843; Notice of Allowance dated Oct. 16, 2017; (pp. 1-7).
USPTO; U.S. Appl. No. 11/394,755, Office Action dated Aug. 14, 2008.
USPTO; U.S. Appl. No. 11/394,755, Office Action dated Feb. 7, 2008.
USPTO; U.S. Appl. No. 11/394,755, Office Action dated Jul. 17, 2007.
USPTO; U.S. Appl. No. 11/394,755, Office Action dated Jul. 17, 2009.
USPTO; U.S. Appl. No. 11/394,755, Office Action dated Mar. 31, 2009.
USPTO; U.S. Appl. No. 11/394,755, Office Action dated May 12, 2011.
USPTO; U.S. Appl. No. 11/394,755; Office Action dated Dec. 19, 2011.
USPTO; U.S. Appl. No. 12/347,266, Office Action dated Mar. 7, 2011.
USPTO; U.S. Appl. No. 12/347,266, Office Action dated Nov. 17, 2010.
USPTO; U.S. Appl. No. 12/347,266, Office Action dated Sep. 7, 2010.
USPTO; U.S. Appl. No. 12/367,295, Office Action dated Feb. 11, 2011.
USPTO; U.S. Appl. No. 12/367,295, Office Action dated Jul. 15, 2011.
USPTO; U.S. Appl. No. 12/367,295; Office Action dated Jun. 8, 2012.
USPTO; U.S. Appl. No. 12/495,178, Office Action dated Feb. 3, 2010.
USPTO; U.S. Appl. No. 12/495,178; Office Action dated Apr. 18, 2014; 12 pages.
USPTO; U.S. Appl. No. 12/495,178; Office Action dated Jun. 21, 2012.
USPTO; U.S. Appl. No. 12/495,178; Office Action dated Mar. 11, 2015; 6 pages.
USPTO; U.S. Appl. No. 12/495,178; Office Action dated Nov. 18, 2014; 8 pages.
USPTO; U.S. Appl. No. 12/495,178; Office Action dated Oct. 6, 2015; 8 pages.
USPTO; U.S. Appl. No. 12/495,193, Office Action dated Jan. 6, 2012.
USPTO; U.S. Appl. No. 12/495,193, Office Action dated May 11, 2011.
USPTO; U.S. Appl. No. 12/495,193; Advisory Action dated Sep. 5, 2013.
USPTO; U.S. Appl. No. 12/495,193; Notice of Allowance dated Feb. 10, 2017; 7 pages.
USPTO; U.S. Appl. No. 12/495,193; Notice of Allowance dated May 4, 2017.
USPTO; U.S. Appl. No. 12/495,193; Notice of Allowance dated Oct. 14, 2016; 7 pages.
USPTO; U.S. Appl. No. 12/495,193; Office Action dated Apr. 18, 2014; 23 pages.
USPTO; U.S. Appl. No. 12/495,193; Office Action dated Aug. 29, 2016.
USPTO; U.S. Appl. No. 12/495,193; Office Action dated Jan. 15, 2015; 11 pages.
USPTO; U.S. Appl. No. 12/495,193; Office Action dated Jun. 18, 2013.
USPTO; U.S. Appl. No. 12/495,193; Office Action dated Oct. 1, 2015; 9 pages.
USPTO; U.S. Appl. No. 13/430,249; Notice of Allowance dated Apr. 14, 2016; 7 pages.
USPTO; U.S. Appl. No. 13/430,249; Notice of Allowance dated Sep. 19, 2016; 6 pages.
USPTO; U.S. Appl. No. 13/430,249; Office Action dated Mar. 24, 2015; 10 pages.
USPTO; U.S. Appl. No. 13/430,249; Office Action dated Oct. 26, 2015; 10 pages.
USPTO; U.S. Appl. No. 13/800,354; Office Action dated Sep. 25, 2014; 13 pages.
USPTO; U.S. Appl. No. 13/839,726; Notice of Allowance dated Aug. 15, 2016; 5 pages.
USPTO; U.S. Appl. No. 13/839,726; Notice of Allowance dated Dec. 1, 2016; 5 pages.
USPTO; U.S. Appl. No. 13/839,726; Notice of Allowance dated Dec. 31, 2015; 5 pages.
USPTO; U.S. Appl. No. 13/839,726; Office Action dated Apr. 26, 2016; 4 pages.
USPTO; U.S. Appl. No. 13/839,726; Office Action dated Mar. 20, 2017; 4 pages.
USPTO; U.S. Appl. No. 13/839,726; Office Action dated May 28, 2015; 5 pages.
USPTO; U.S. Appl. No. 13/839,726; Office Action dated May 30, 2017; (4 pages).
USPTO; U.S. Appl. No. 13/964,903; Office Action dated Jun. 3, 2015; 21 pages.
USPTO; U.S. Appl. No. 13/964,903; Office Action dated Mar. 7, 2016; 21 pages.
USPTO; U.S. Appl. No. 14/047,489; Office Action dated Jun. 29, 2015; 7 pages.
USPTO; U.S. Appl. No. 14/047,489; Office Action dated Oct. 7, 2015; 9 pages.
USPTO; U.S. Appl. No. 14/139,217; Office Action dated Apr. 8, 2015; 9 pages.
USPTO; U.S. Appl. No. 14/139,217; Office Action dated Sep. 18, 2015; 11 pages.
USPTO; U.S. Appl. No. 14/385,564; Office Action dated Aug. 10, 2016; 9 pages.
USPTO; U.S. Appl. No. 14/385,564; Office Action dated Mar. 10, 2017; 8 pages.
USPTO; U.S. Appl. No. 14/475,435; Office Action dated Jan. 26, 2017.

(56) References Cited

OTHER PUBLICATIONS

USPTO; U.S. Appl. No. 14/475,435; Office Action dated Jul. 20, 2016; 9 pages.
USPTO; U.S. Appl. No. 14/518,774; Office Action dated May 10, 2017.
USPTO; U.S. Appl. No. 14/851,545; Office Action dated Apr. 24, 2017.
USPTO; U.S. Appl. No. 14/910,573; Office Action dated Jun. 27, 2017; (10 pages).
USPTO; U.S. Appl. No. 15/344,843; Office Action dated Apr. 28, 2017.
USPTO; U.S. Appl. No. 13/964,903; Office Action dated Oct. 31, 2016; 22 pages.
Wagar, J. Alan, et al., "Effectiveness of Three Barrier Materials for Stopping Regenerating Roots of Established Trees," Journal of Arboriculture, 19(6), Nov. 1993, pp. 332-338.
Westgate, Philip J., "Preliminary Report on Copper Toxicity and Iron Chlorosis in Old Vegetable Fields," Florida State Horticultural Society, 1952, pp. 143-146.
USPTO; U.S. Appl. No. 15/952,510; Office Action dated Aug. 6, 2019; (pp. 1-14).
ASME 2015 International Design Engineering Technical Conferences & Computers and Information in Engineering Conference, K. Taylor et al, "A Mathematical Model for Pressure Compensating Emitters", Aug. 2-5, 2015, Boston, Massachusetts, USA, 10 pp.
Brazilian Patent and Trademark Office, Search Report dated Nov. 19, 2018 for Brazilian Patent Application No. BR 11 2014 023843-0, 2 pages.
Brazilian Patent and Trademark Office, Technical Examination Report dated Nov. 19, 2018 for Brazilian Patent Application No. BR 11 2014 023843-0, 9 pages.
Cetesb and Sindiplast, Environmental Guide of the Plastic Materials Recycling and Processing Industry [electronic resource], Technical elaboration: Gilmar do Amaral et al., Collaborators: Andre H.C. Botto e Souza et al., 2011. Retrieved from the Internet: <URL: http://file.sindiplast.org.br/download/guia_ambiental_internet.pdf>, 91 pages.
DIG® Irrigation Product Catalog 2012, <www.digcorp.com>, 2012, 32 pages.
DIG® Irrigation Product Catalog 2016, <www.digcorp.com>, Nov. 9, 2016, 72 pages.
DIG® Irrigation Product Catalog 2018, <www.digcorp.com>, Oct. 23, 2017, 72 pages.
Dixieline Lumber & Home Centers Catalog, DIG Irrigation Products Drip Tubing, 2003, p. 13.
EURODRIP U.S.A., Inc., 2009 Irrigation Products Catalog, p. 4-5, 4 pages.
EURODRIP U.S.A., Inc., Products Guide, copyright date Nov. 2007, 2 pages.
European Patent Application No. 18172143.2, Extended European Search Report, dated Oct. 15, 2018, 9 pages.
European Patent Office, Communication Pursuant to Article 94(3) EPC issued in European Application No. 13 768 209.2, dated Jan. 4, 2019, 5 pp.
http://aasystems.eu/dripper/; Advanced Automation Systems Ltd., Dec. 18, 2015, 12 pp.
Hunter Industries, Drip Design Guide, Dec. 2012, 32 pages.
Irritec® On Line Drippers iDrop®, Irritec S.p. A, <www.irritec.com>, Nov. 5, 2014, 2 pages.
Irritec® Product Catalog and Price List 2016, Irritec USA Inc., <www.irritec.com>, Oct. 2, 2015, 66 pages.
Irritec™ USA iDropTM PCDS, Irritec USA Inc., <www.irritecusa.com>, Jul. 26, 2012, 2 pages.
Jain Irrigation Inc., 2009 Product Catalog, pp. 12-13, copyright date 2009 (revised Oct. 2008), 4 pages.
Jain® Button Emitters, Jain Irrigation Inc., <www.jainsusa.com>, Jan. 5, 2015, 2 pages.
Jain® Emission Devices, Jain Irrigation Systems Ltd., <www.jainsusa.com>, Nov. 22, 2016, pp. 171-182.
Jain® Landscape Catalog, Jain Irrigation, Inc., <www.jainsusa.com>, Dec. 7, 2015, 102 pages.
Jain® Online Emitters, Jain Irrigation Systems Ltd., <www.jainsusa.com>, Mar. 12, 2015, 2pages.
Lady Bug Emitter, Rain Bird Sales, Inc., <https://web.archive.org/web/19980121011011/http://www.rainbird.com:80/rbturf/products/xeri/emission/ladybug.htm>, dated Dec. 1997, 2 pages.
metzerplas.com, OEM Drippers, Sep. 29, 2013, [online]. Retrieved from the Internet via the Internet Archive: Wayback Machine: <URL: http://metzerplas.com/en-US/48/865/> on Dec. 10, 2018, 2 pages.
Multi-Outlet Xeri-Bug™, Rain Bird Sales, Inc., <https://web.archive.org/web/19980121010952/http://www.rainbird.com:80/rbturf/products/xeri/emission/moutlet.htm>, 1997, 2 pages.
NDS Inc., AGRIFIM Drip and Micro Irrigation Catalog, Jan. 2004, 3 pages.
NETAFIM USA, Landscape & Turf Division Product Catalog, Aug. 2004, 36 pages.
NETAFIM, RAM Pressure Compensating Dripperline brochure, Feb. 1997, 4 pages.
Netafim™ Non-Pressure Compensating Drippers, Netafim USA, <www.netafimusa.com>, Nov. 13, 2012, 2 pages.
Netafim™ Point Source Emitters, Netafim USA, <www.netafimusa.com>, Oct. 3, 2016, 4 pages.
Netafim™ Pressure Compensating (PC) Spray Stakes, Netafim USA,<www.netafimusa.com>, Feb. 26, 13, 12 pages.
Netafim™ Pressure Compensating Drippers, Netafim USA, <www.netafimusa.com>, Jun. 1, 2018, 2 pages.
Netafim™ Pressure Compensating Drippers, Netafim USA, <www.netafimusa.com>, Apr. 2016, 2 pages.
Patent Cooperation Treaty, International International Searching Authority, Notification of Transmittal of the International Search Report and the Written Opinion of the International Searching Authority, or the Declaration, issued in International Application No. PCT/US2018/015516, dated Jun. 28, 2018, 8 pp.
Photograph of DIG® Product No. PCA-003CV, Nov. 21, 2015, 1 page.
Photograph of Irritec® Product No. A6-WPC2BB, Jul. 26, 2012, 1 page.
Photograph of Irritec® Product No. A6-WPC3BB, Jul. 26, 2012, 1 page.
Photograph of Jain® Product No. CTTPC2-CNL, Jan. 5, 2015, 1 page.
Photograph of Jain® Product No. CTTPC4-CNL, Jan. 5, 2015, 1 page.
Photograph of Netafim™ Product No. SPCV10, Oct. 3, 2016, 1 page.
Photograph of Netafim™ Product No. Techflow Emitter WPC20, Nov. 13, 2012, 1 page.
Photograph of Netafim™ Product No. WPC10, Nov. 13, 2012, 1 page.
Photograph of Netafim™ Woodpecker Junior Product No. 01WPCJL4, Jan. 2012, 1 page.
Photograph of Toro® Product No. DPC08-MA-Red, Jun. 22, 2012, 1 page.
Photographs of an in-line cylindrical drip emitter on sale or publicly disclosed more than a year before the filing of the instant application, 2 pages.
Pressure-Compensating Modules, Rain Bird Sales, Inc., <https://web.archive.org/web/19980121011024/http://www.rainbird.com:80/rbturf/products/xeri/emission/prescmp.htm>, 1997, 2 pages.
Price Book, Oct. 2015, Rivulis Irrigation, Oct. 2015 (Revised Apr. 28, 2016), <rivulis.com>, 116 pages.
Rain Bird Corporation, Rain Bird PC Dripline brochure, copyright date Nov. 2000, 12 pages.
Rain Bird Multi-Outlet Xeri-Bug, 1998, 1 page.
Rain Bird Pressure-Compensating Module, 1998, 1 page.
Rain Bird Xeri-Bug, 1998, 3 pages.
Rain Bird® Consumer Products Catalog, Tubing, D33305-11, copyright date 2010, p. 48.
Rain Bird® Landscape Irrigation Products 1997-1998 Catalog, Component and Emmision Device, D48301, copyright date Aug. 1997, pp. 128-129.

(56) References Cited

OTHER PUBLICATIONS

Rain Bird® Landscape Irrigation Products 1999-2000 Catalog, Emission Devices, D37200, copyright date Aug. 1998, pp. 136-137.
Rain Bird® Landscape Irrigation Products 2004 New Products Catalog, D37200D, copyright date Oct. 2003, pp. 41-42.
Rain Bird® Landscape Irrigation Products 2008-2009 Catalog, D37200H, copyright date Sep. 2007, pp. 180-187.
Rain Bird® Landscape Irrigation Products, Rain Bird Dripline Series, RBE-03-TE-10, copyright date Aug. 2003, pp. 106-107.
Rain Bird® Nursery Equipment Catalog 1986-1987, D32304, copyright date 1986, p. 13.
Rain Bird® XF Series Dripline | Design, Installation and Maintenance Guide, D40024A, copyright date Feb. 2012, 48 pages.
Rain Bird® XFCV Dripline with Heavy-Duty Check Valve, D40215, copyright date Oct. 2012, 2 pages.
Rain Bird® XFD Dripline with Greater Flexiblity, D39994B, copyright date Jan. 2012, 2 pages.
Rain Bird® XFS Dripline with Copper Shield™ Technology, D39978B, copyright date Jan. 2012, 2 pages.
Rain Tape Design Guide, Rain Bird®, D35252, document was published more than a year before the filed of the instant application, 5 pages.
Siplast/Irritec Multibar Pressure Compensated Coextruded Dripline, Jul. 22, 2005, 4 pages.
State Intellectual Property Office of People's Republic of China, First Office Action issued in Application No. 201480045002.0, dated Apr. 16, 2018, 20 pp.
The Toro Company, 2000-2001 Irrigation Products Catalog, p. 28, copyright date Oct. 1999, 3 pages.
The Toro Company, Drip In Classic Turbulent Flow Dripline brochure, Jun. 2014, 4 pages.
The Toro Company, Drip In PC Brown Dripline brochure, 2015, 2 pages.
Toro® NGE® AL Anti-Drain Pressure Compensating Emitter, The Toro Company, <www.toro.com>, Jun. 23, 2012, 2 pages.
Toro® NGE® Emitters, The Toro Company, <www.toro.com>, May 16, 2018, 2 pages.
Toro® NGE® New Generation Emitters, The Toro Company, <www.toro.com>, Feb. 21, 2013, 2 pages.
Toro® NGE® SF Self-flushing Pressure Compensating Emitter, The Toro Company, <www.toro.com>, Jun. 22, 2012, 2 pages.
Toro® Turbo-SC® Plus Pressure-compensating Emitter, The Toro Company, <www.toro.com>, May 6, 2009, 2 pages.
USPTO; U.S. Appl. No. 13/964,903; Notice of Allowance dated Apr. 5, 2018, 5 pages.
USPTO; U.S. Appl. No. 14/036,881; Corrected Notice of Allowability dated May 21, 2018, 2 pages.
USPTO; U.S. Appl. No. 14/036,881; Notice of Allowance dated May 9, 2018, 5 pages.
USPTO; U.S. Appl. No. 14/910,573; Office Action dated Feb. 13, 2018; 10 pages.
USPTO; U.S. Appl. No. 15/650,379; Office Action dated May 18, 2018, 8 pages.
USPTO; U.S. Appl. No. 13/964,903; Notice of Allowance dated Mar. 26, 2019; (pp. 1-5).
USPTO; U.S. Appl. No. 13/964,903; Notice of Allowance dated Sep. 26, 2018; (pp. 1-5).
USPTO; U.S. Appl. No. 13/964,903; Notice of Allowance dated Dec. 14, 2018; (pp. 1-5).
USPTO; U.S. Appl. No. 14/036,881; Notice of Allowance dated Jun. 21, 2019; (pp. 1-6).
USPTO; U.S. Appl. No. 14/036,881; Notice of Allowance dated Aug. 30, 2018; (pp. 1-6).
USPTO; U.S. Appl. No. 14/851,545; Notice of Allowance dated Apr. 17, 2019; (pp. 1-9).
USPTO; U.S. Appl. No. 14/851,545; Office Action dated Jul. 3, 2018; 29 pages.
USPTO; U.S. Appl. No. 14/851,545; Office Action dated Oct. 29, 2018; (pp. 1-32).
USPTO; U.S. Appl. No. 14/910,573; Office Action dated May 6, 2019; (pp. 1-11).
USPTO; U.S. Appl. No. 14/910,573; Office Action dated Sep. 26, 2018; (pp. 1-11).
USPTO; U.S. Appl. No. 15/595,427; Office Action dated Apr. 4, 2019; (pp. 1-6).
USPTO; U.S. Appl. No. 15/595,427; Office Action dated Jun. 6, 2019; (pp. 1-5).
USPTO; U.S. Appl. No. 15/595,427; Office Action dated Dec. 17, 2018; (pp. 1-6).
USPTO; U.S. Appl. No. 15/650,379; Notice of Allowance dated Feb. 19, 2019; (pp. 1-5).
USPTO; U.S. Appl. No. 15/650,379; Notice of Allowance dated Mar. 26, 2019; (pp. 1-5).
USPTO; U.S. Appl. No. 15/650,379; Notice of Allowance dated Oct. 24, 2018; (pp. 1-7).
USPTO; U.S. Appl. No. 15/853,135; Notice of Allowance dated May 20, 2019; (pp. 1-10).
USPTO; U.S. Appl. No. 14/910,573; Notice of Allowance dated Sep. 3, 2019; (pp. 1-11).
Eco iMat LLC dba ecorain® USA, iMat Solution, <www.ecorainusa.>, illustrating a product available since Nov. 25, 2015, 6 pages.
Eco Rain AG, iMat® Irrigation Mat, <http://www.ecorain.de/files/imat_irrigation_mat.pdf>, illustrating a product available since Sep. 18, 2016, 8 pp.
Ecorain USA, iMat FAQ document, illustrating a product available since 2017, 6 pp.
Encyclopaedia Britannica, Inc., "Peristalsis," Nov. 30, 2017, [online]. Retrieved from the Internet: <URL: https://www.britannica.com/print/article/452053 >, 2 pages.
European Patent Office, Extended European Search Report for European Application No. 17831631.1, dated Feb. 3, 2020, 9 pp.
USPTO; U.S. Appl. No. 14/910,573; Notice of Allowance dated Feb. 26, 2020; (pp. 1-5).
USPTO; U.S. Appl. No. 15/595,427; Notice of Allowance dated Jan. 23, 2020; (pp. 1-7).
USPTO; U.S. Appl. No. 15/595,427; Notice of Allowance dated Feb. 25, 2020; (pp. 1-7).
USPTO; U.S. Appl. No. 15/858,685; Office Action dated Jan. 14, 2020; (pp. 1-10).
USPTO; U.S. Appl. No. 15/881,285; Office Action dated Dec. 30, 2019; (pp. 1-12).
USPTO; U.S. Appl. No. 16/532,006; Office Action dated Jan. 6, 2020; (pp. 1-10).

* cited by examiner

DRIP EMITTER

CROSS REFERENCE TO RELATED APPLICATIONS

This application is a continuation application of U.S. patent application Ser. No. 12/495,193, filed Jun. 30, 2009, which is a divisional application of U.S. patent application Ser. No. 11/359,181, filed Feb. 22, 2006, now issued as U.S. Pat. No. 7,648,085, both of which are incorporated herein by reference in their entirety.

FIELD OF THE INVENTION

The present invention relates to irrigation drip emitters, and more particularly, to subsurface irrigation drip emitters.

BACKGROUND OF THE INVENTION

Drip irrigation emitters are generally known in the art for use in delivering irrigation water to a precise point at a predetermined and relatively low volume flow rate, thereby conserving water. Such irrigation devices typically comprise an emitter housing connected to a water supply tube through which irrigation water is supplied under pressure. The drip irrigation device taps a portion of the relatively high pressure irrigation water from the supply tube for flow through a typically long or small cross section flow path to achieve a desired pressure drop prior to discharge at a target trickle or drip flow rate. In a conventional system, a large number of the drip irrigation devices are mounted at selected positions along the length of the supply tube to deliver the irrigation water to a large number of specific points, such as directly to a plurality of individual plants.

Subsurface drip emitters provide numerous advantages over drip emitters located and installed above ground. First, they limit water loss due to runoff and evaporation and thereby provide significant savings in water consumption. Water may also be used more economically by directing it at precise locations of the root systems of plants or other desired subsurface locations.

Second, subsurface drip emitters provide convenience. They allow the user to irrigate the surrounding terrain at any time of day or night without restriction. For example, such emitters may be used to water park or school grounds at any desired time. Drip emitters located above ground, on the other hand, may be undesirable at parks and school grounds during daytime hours when children or other individuals are present.

Third, subsurface emitters are not easily vandalized, given their installation in a relatively inaccessible location, i.e., underground. Thus, use of such subsurface emitters results in reduced costs associated with replacing vandalized equipment and with monitoring for the occurrence of such vandalism. For instance, use of subsurface emitters may lessen the costs associated with maintenance of publicly accessible areas, such as parks, school grounds, and landscaping around commercial buildings and parking lots.

Fourth, the use of subsurface drip emitters can prevent the distribution of water to undesired terrain, such as roadways and walkways. More specifically, the use of subsurface drip emitters prevents undesirable "overspray." In contrast, above-ground emitters often generate overspray that disturbs vehicles and/or pedestrians. The above-identified advantages are only illustrative; other advantages exist in connection with the use of subsurface drip emitters.

There is a need to provide for a relatively constant water output from subsurface emitters, regardless of fluctuations in the water pressure in the supply tube. Without such flow rate compensation, water pressure fluctuations in the supply tube will cause corresponding fluctuations in the emitter water output. Such fluctuations result in the inefficient and wasteful use of water.

There is also a need in the irrigation industry to keep subsurface drip emitters from becoming obstructed, which results in insufficient water distribution and potential plant death. Obstruction of an emitter may result from the introduction of grit, debris, or other particulate matter, both from debris entering the emitter through the supply tube and debris entering the emitter from the terrain being irrigated, i.e., "back siphoning." Such obstruction of an emitter may result in severe, and in some cases complete, flow restriction, potentially preventing the emitter from operating entirely. Many irrigation systems depend on the operation of each specifically situated emitter for sufficient water coverage to maintain healthy grass, crop, or other plant growth. Accordingly, there is a need to prevent subsurface drip emitters from becoming obstructed.

Further, there is a need to prevent obstruction of an emitter outlet by plant roots intruding into the outlet. Some conventional methods of preventing root intrusion, and the accumulation of microscopic organisms, involve the use of herbicides, fungicides, algaecides, biocides, etc. For example, in some instances, herbicides have been released indiscriminately into the soil in an attempt to prevent plant root intrusion. Alternatively, herbicides have been mixed with the plastic materials from which the irrigation supply tube is made. Also, such chemicals have sometimes been mixed in dilute quantities with the irrigation water distributed by the tube.

These conventional methods are often not directed specifically to the emitters and emitter outlets and, therefore, may be of only limited effectiveness in preventing root intrusion. In addition, such conventional methods generally target plants and the environment indiscriminately and may have serious adverse effects on the health of plants, as well as the broader environment as a whole. Accordingly, there is a need for a mechanism that is more targeted and more environmentally friendly.

DESCRIPTION OF THE PREFERRED EMBODIMENT

Figure 1:
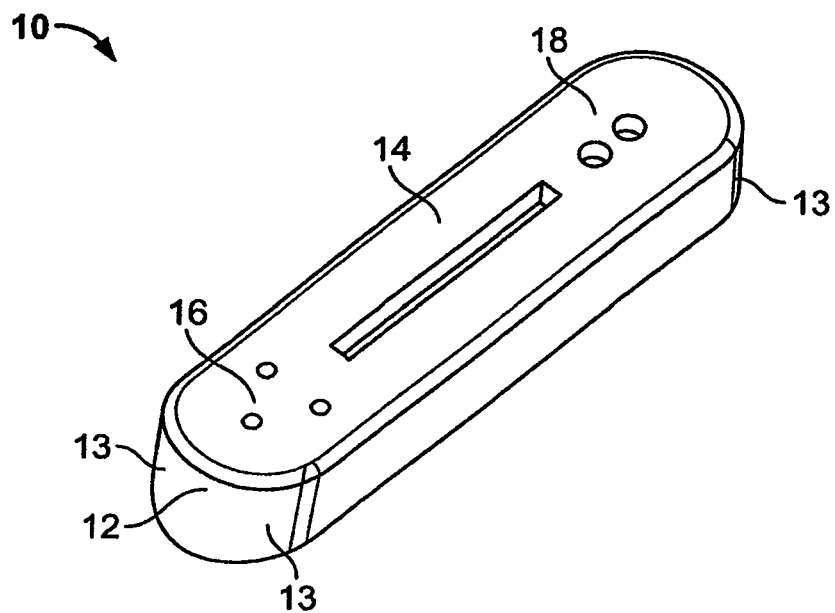
FIG. 1 is a top perspective view of a drip emitter embodying features of the present invention.

With respect to FIGS. 1-5, a drip irrigation emitter 10 is provided for delivering irrigation water from a water supply conduit, such as an irrigation supply tube, at a low volume, substantially trickle, or drip flow rate. The emitter 10 operates generally through the use of a tortuous path flow channel 38 that causes a pressure reduction between the irrigation tube and an emitter outlet 22. The emitter 10 includes a first inlet 16 for tapping a portion of the water flow from the irrigation tube, and, when the water pressure is above a predetermined minimum level, directing the flow to and through the tortuous path flow channel 38 for subsequent discharge to a desired location. In the preferred embodiment, the emitter 10 also includes a second inlet 18 for maintaining relatively constant output water flow by compensating for fluctuations in water pressure in the irrigation tube.

The emitter 10 comprises a compact housing 12 made of a sturdy and non-corrosive material. As shown in FIG. 1, the top surface 14 of the emitter 10 defines two sets of inlets, each including one or more openings extending through the top surface 14. The inlets are exposed to the irrigation water flowing through the inside of the irrigation tube.

The first inlet 16 is shown in FIG. 1 and preferably includes three openings. Water flowing into the first inlet 16 proceeds through the body of the emitter 10 to an emitter outlet 22. In traveling through the emitter 10 to the emitter outlet 22, water pressure is reduced and water flow is reduced to a trickle or drip flow rate, as described in more detail below. The three openings are preferably sufficiently small in diameter to perform a filter function for water flowing through the first inlet 16, i.e., to filter out debris or grit that might otherwise clog the interior of the emitter 10. As shown in FIG. 1, the openings making up the first inlet 16 are also preferably spaced in a triangular pattern to allow water to uniformly impact interior surfaces of the emitter 10. Although three equally spaced openings are shown in the preferred embodiment, other numbers and arrangements of openings may be utilized to form the first inlet 16.

The second inlet 18 is shown in FIG. 1 as preferably including two openings spaced along a center axis bisecting the length of the emitter 10. Water flowing into the second inlet 18 does not proceed through the body of the emitter 10 but, instead, serves a pressure compensation function. As described below, water flowing into the second inlet 18 accumulates in a chamber in the interior of the emitter 10, applying pressure to the chamber in an amount substantially equivalent to the pressure in the irrigation tube. Because water flowing through the second inlet 18 does not flow through the emitter 10, the openings of the second inlet 18 need not filter the inflowing water and the openings need not be small in diameter. Although two openings are shown in the preferred embodiment, as seen in FIG. 1, other numbers and arrangements of openings may be utilized to form the second inlet 18.

Figure 2:
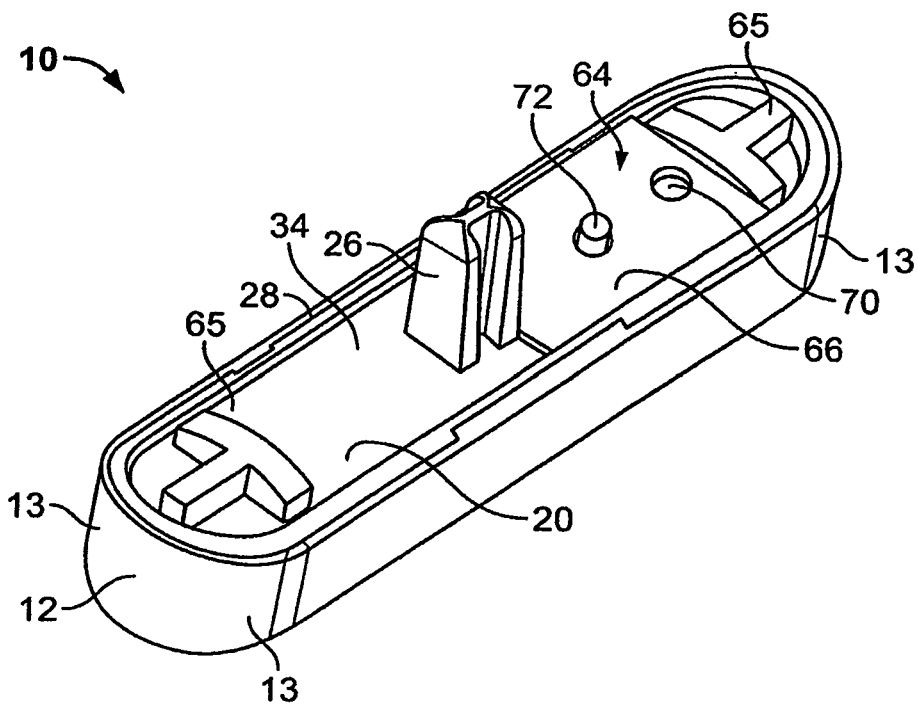
FIG. 2 is a bottom perspective view of the drip emitter of FIG. 1.
Figure 3:
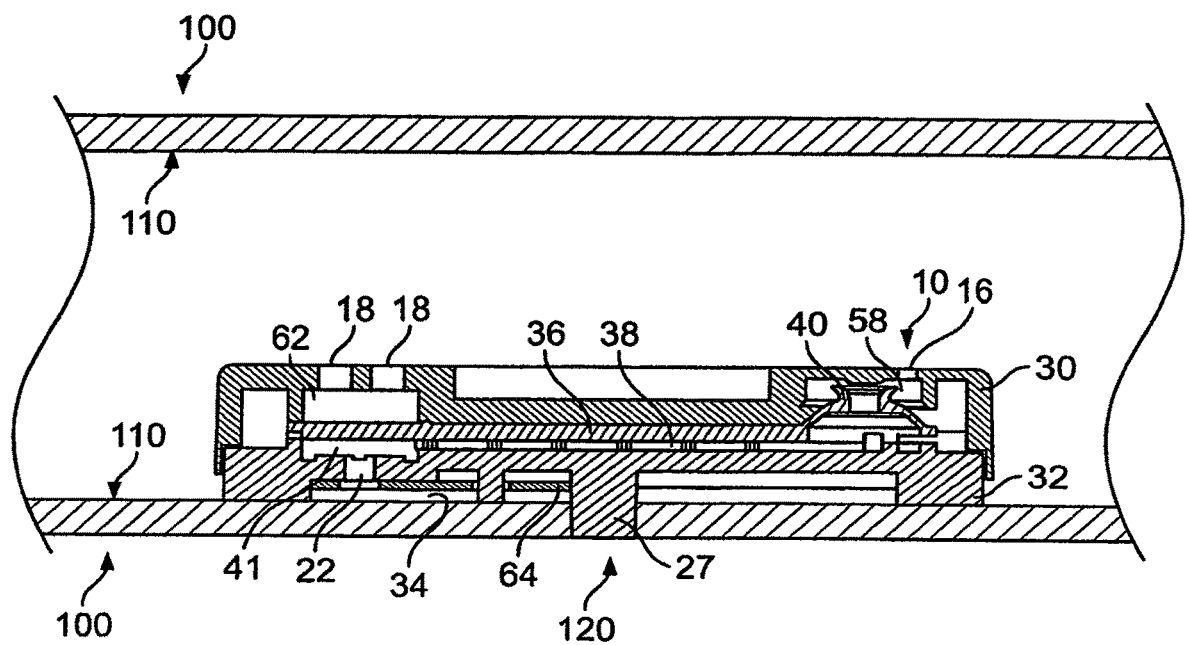
FIG. 3 is a cross-sectional view of the drip emitter of FIG. 1 showing the emitter mounted in an irrigation supply tube.

FIG. 2 shows the base 20 of the emitter 10 with an emitter outlet 22, composed of at least one opening, extending through the base 20, and with a raised rim 28 extending about the perimeter of the base 20. During assembly, a number of emitters 10 are mounted to the inside surface 110, or wall 110, of an irrigation tube 100 at predetermined spaced intervals with each emitter 10 oriented such that the raised rim 28 of each is pressed into sealing engagement with the inside surface 110 of the irrigation tube 100, as shown in FIG. 3. Thus, the raised rim 28 of each emitter 10 is used to mount the emitter 10 to the inside surface 110 of the irrigation tube 100 by acting as an attachment zone. Further, when the base 20 of each emitter 10 is mounted and the raised rim 28 of each emitter 10 is bonded into sealing engagement with the inside surface 110 of the irrigation tube 100, a gap is formed between the remainder of the base 20 (inside the perimeter) and the inside surface 110 of the tube 100. The gap resulting from the mounting of the emitter base 20 to the tube wall 110 forms an outlet bath 34 for the discharge of water from the emitter 10, as described below.

As shown in FIG. 2, the base 20 of the emitter 10 also preferably includes an elongated protrusion, or chimney, 26, which, in the preferred embodiment, has an I-shaped cross-section. The chimney 26 is adapted to push outwardly against the tube wall 110 during assembly, thereby forming an area of the irrigation tube 100 that bulges outward. The outside of the tube 100 then passes under a cutting tool that cuts the projecting tube portion and projecting end of the chimney 26 to form a supply tube outlet 120 that, in contrast to the emitter outlet 22, extends through the wall 110 of the irrigation tube 100. After cutting, as shown in FIG. 3, the remaining uncut chimney portion 27 extends between the base 20 of the emitter 10 and through the tube outlet 120, allowing water to flow to terrain outside the tube 100. More specifically, water exiting the emitter 10 through the emitter outlet 22 flows into outlet bath 34 and trickles out to the terrain to be irrigated through the elongated channels formed by the I-shaped cross-section of the remaining chimney portion 27 and through the supply tube outlet 120. The outlet bath 34 acts as an outlet conduit between the emitter outlet 22 and the supply tube outlet 120 when the emitter 10 is mounted inside the tube 100.

In the preferred embodiment, the chimney 26 is composed of an I-shaped cross-section. It should be evident, however, that the chimney 26 may be composed of other cross-sections, such as a T-shaped or S-shaped cross-section. The cross-section need only be of a shape that will result in elongated flow channels permitting fluid flow through the supply tube outlet 120 when the protruding portion of the chimney 26 is cut off. For example, a chimney 26 having a solid circular cross-section would not be desirable because it would completely obstruct the supply tube outlet 120 when cut off during assembly.

Figure 4:
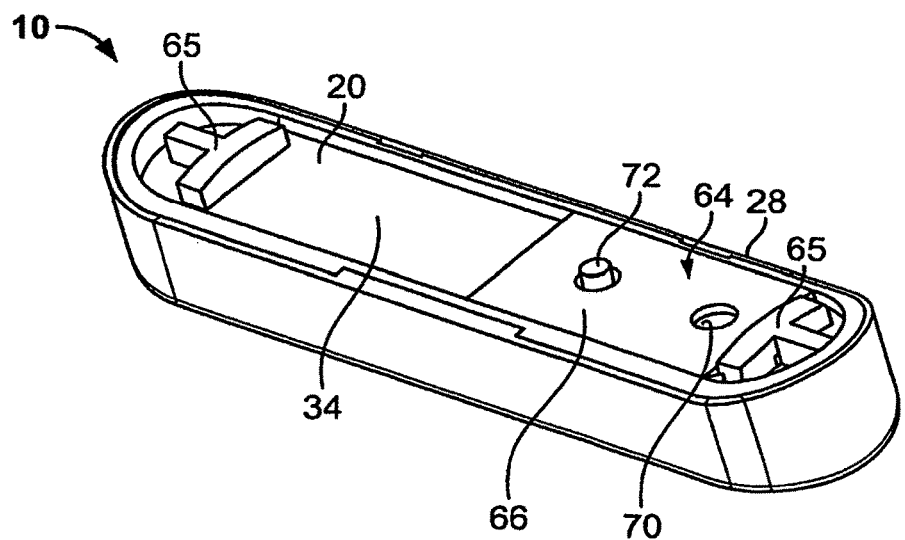
FIG. 4 is a bottom perspective view of the drip emitter of FIG. 1 without the chimney feature.

Further, in other embodiments, the chimney feature need not be used at all. In the preferred embodiment, the chimney 26 is used, during assembly, to create an outlet 120 extending through the irrigation tube 100 for each emitter 10. It should be evident, however, that there are alternative ways of creating such outlets 120. Thus, other embodiments may use alternative ways of forming outlets extending through the irrigation tube wall 110. FIG. 4 shows such an emitter 10 without a chimney 26.

The emitter 10 is preferably of the shape shown in FIGS. 1 and 2, but may be of any suitable size and shape to allow it to be mounted inside the irrigation tube 100. The emitter 10 also preferably has rounded corners 13 to reduce its profile with respect to water flowing through the irrigation tube 100. This profile reduces the force exerted by onrushing water acting to dislodge the emitter 10 from the inside surface 110 of the tube 100.

Figure 5:
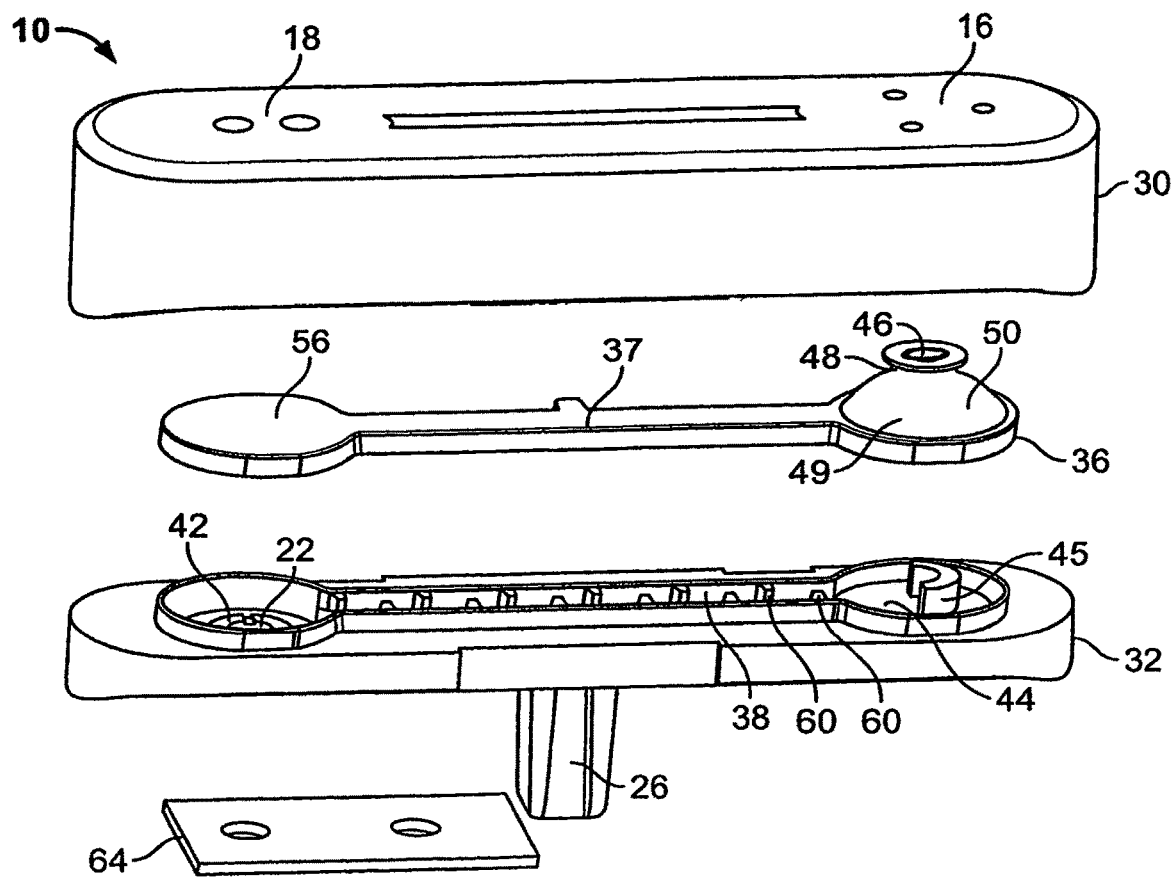
FIG. 5 is an exploded perspective view of the drip emitter of FIG. 1.
Figure 6:
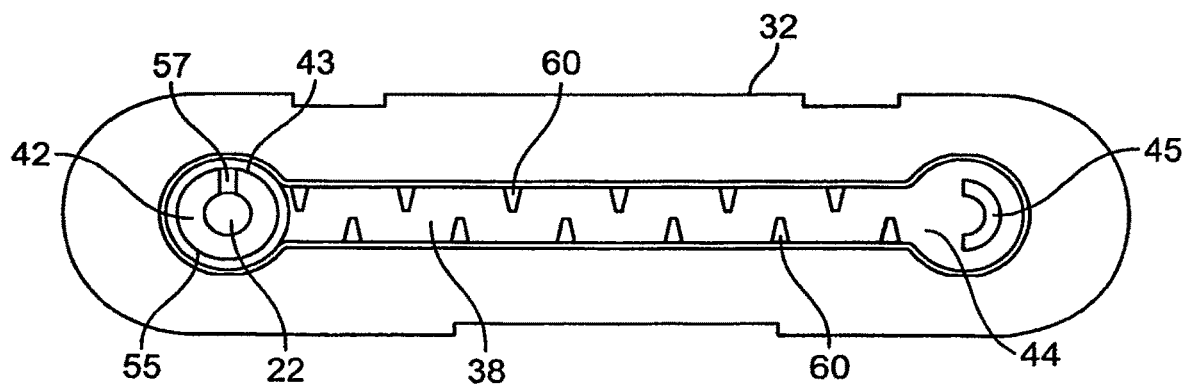
FIG. 6 is a top plan view of the lower housing of the drip emitter of FIG. 1.
Figure 7:
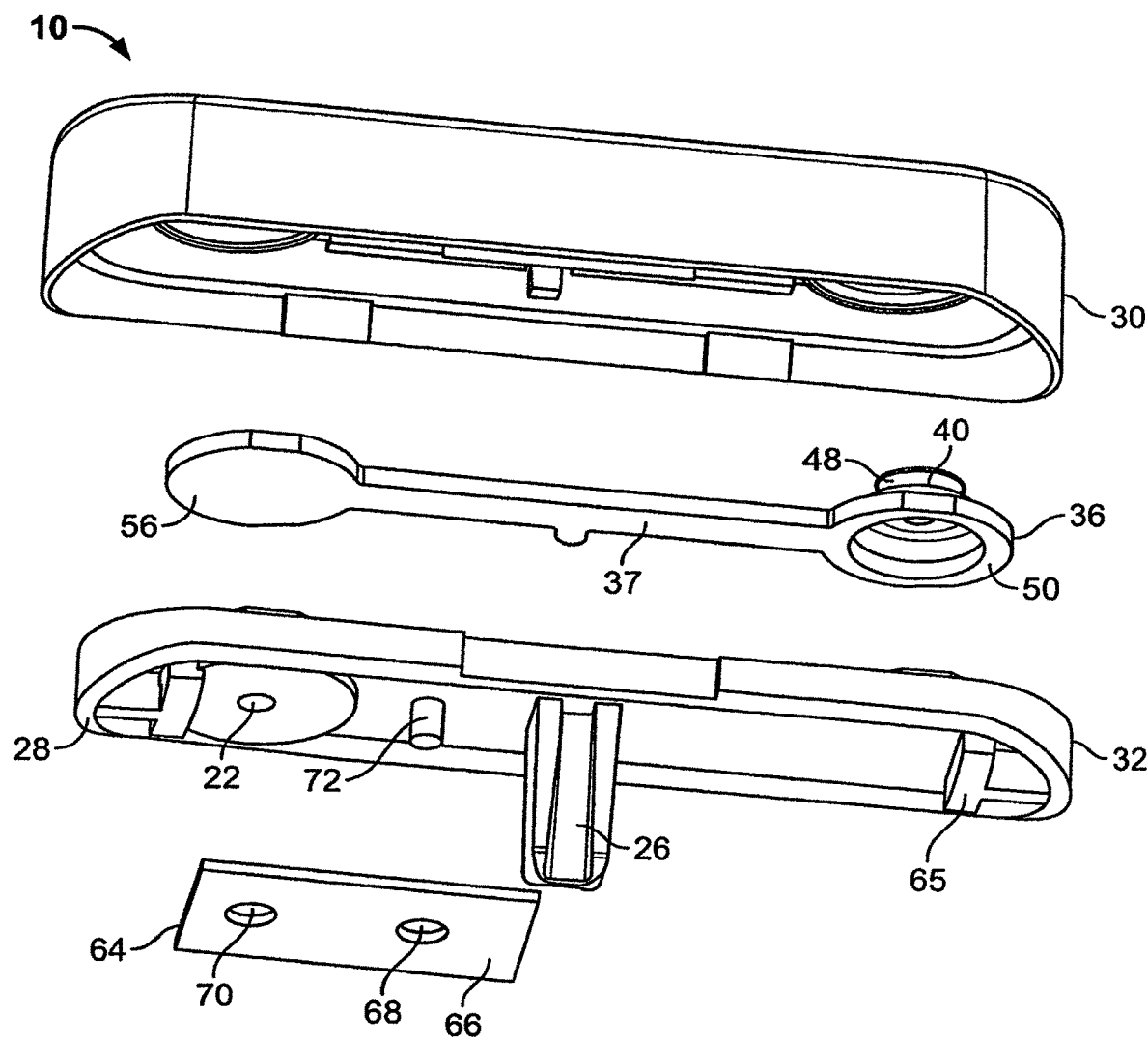
FIG. 7 is another exploded perspective view of the drip emitter of FIG. 1.
Figure 8:
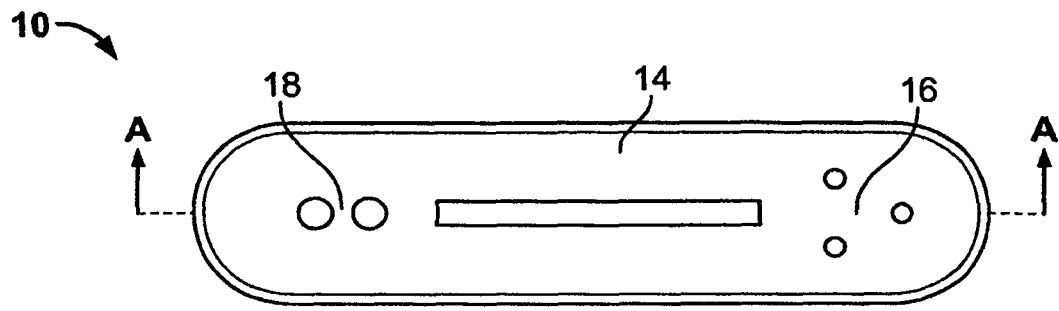
FIG. 8 is a top plan view of the drip emitter of FIG. 1.

As shown in FIGS. 5-7, the emitter 10 generally includes four components: an upper housing 30, a lower housing 32, a diaphragm 36, and a copper member 64. The upper housing 30 and lower housing 32 may be conveniently and economically formed from assembled plastic molded housing components. Although the preferred embodiment uses two separate housing pieces assembled together, one integral housing piece (having a lower housing portion and an upper housing portion) may also be used. The upper housing 30 is adapted for assembly with the lower housing 32 to form a substantially enclosed housing interior, which encloses the diaphragm 36. A copper member 64 is preferably mounted to the underside of the lower housing 32. The preferred embodiment uses smaller components and less material than conventional emitters, resulting in cost savings.

The upper housing 30 includes the first inlet 16 and the second inlet 18, each inlet including one or more openings extending through a portion of the upper housing 30. The lower housing 32 includes the emitter outlet 22, which extends through a portion of the lower housing 32. Further, the lower housing 32 preferably includes the chimney 26, which projects away from the upper housing 30. The lower housing 32 also includes raised rim 28 located about the perimeter of the lower housing 32, the raised rim 28 defining outlet bath 34 when mounted to the inside surface 110 of the irrigation tube 100.

The flexible diaphragm 36, interposed between the upper housing 30 and lower housing 32, is preferably a silicone or rubber membrane extending centrally between the housing portions. The diaphragm is preferably shaped like a barbell and dimensioned to overlap and seal against the tortuous path flow channel 38 and water metering surface 42 of the lower housing 32. The diaphragm 36 has a first end 50 located beneath, and in flow communication with, the first inlet 16. The first end 50 defines a valve 40, which regulates flow from the first inlet 16 to the tortuous path flow channel 38, as described below. The first end 50 of the diaphragm 36 extends into a central, elongated strip 37, which overlays and sealingly engages the tortuous path flow channel 38. In turn, the central strip 37 extends into a second end 56 of the diaphragm 36, which is located beneath, and is in flow communication with, the second inlet 18. The second end 56 is preferably circular in shape to overlap and sealingly engage the water metering surface 42 of the lower housing 32.

The lower housing 32 includes an inlet end 44, the tortuous path flow channel 38, and the water metering surface 42, which are formed on the interior side of the lower housing 32. Water flows in the flow path defined by interior side of the lower housing 32 and the overlaying diaphragm 36. More specifically, water enters the inlet end 44, flows through the tortuous path flow channel 38, and flows through the water metering surface 42 to the emitter outlet 22.

The tortuous path flow channel 38 preferably includes a number of alternating, flow diverting ribs 60 projecting partially into the flow channel 38 and causing frequent, regular, and repeated directional changes in water flow. Accordingly, the water flow takes on a back and forth zigzag pattern. The tortuous path flow channel 38 causes a relatively significant reduction in water pressure. In contrast, the water metering surface 42 is responsive to more subtle fluctuations in water pressure in the irrigation tube 100.

Figure 9:
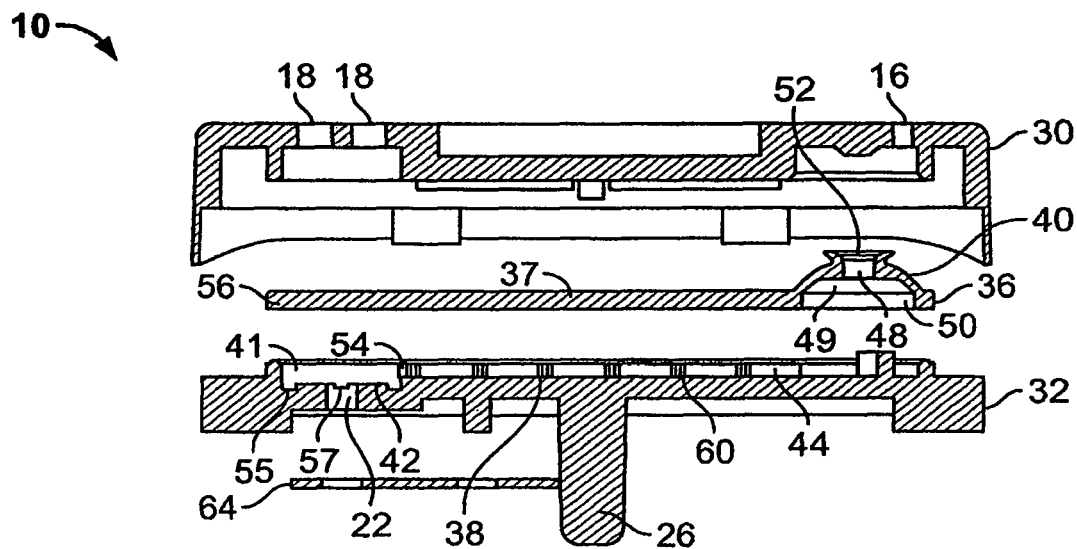
FIG. 9 is an exploded cross-sectional view of the drip emitter of FIG. 1 taken along line A-A of FIG. 8.
Figure 10:
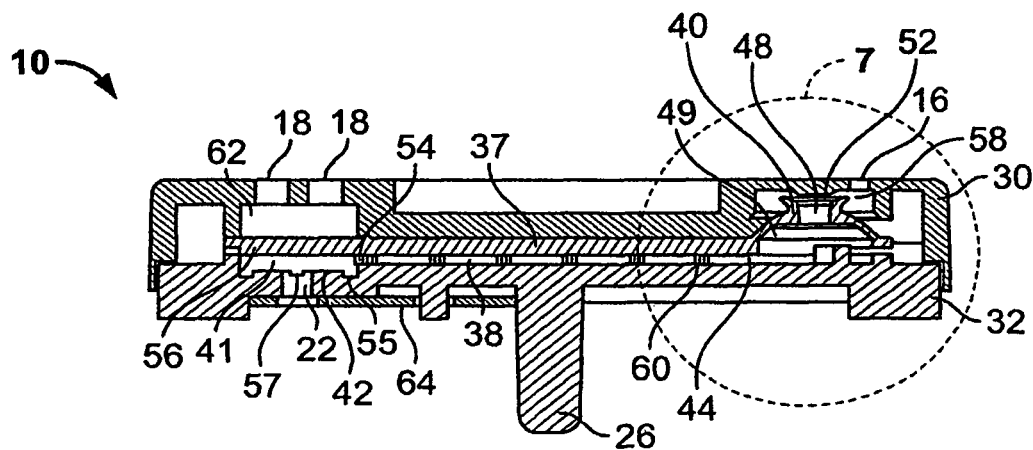
FIG. 10 is a cross-sectional view of the drip emitter of FIG. 1 taken along line A-A of FIG. 8.
Figure 11:
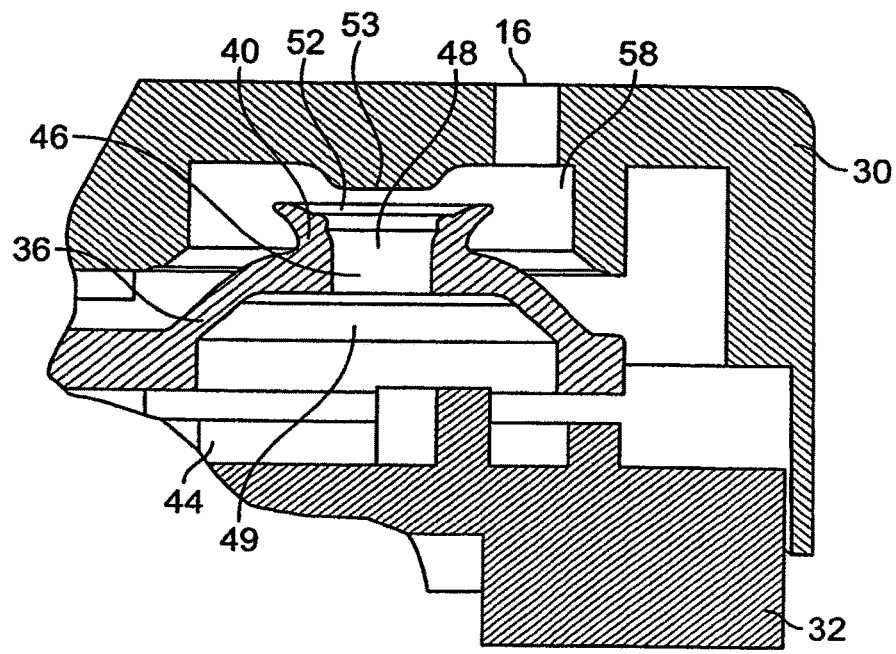
FIG. 11 is an enlarged partial cross-sectional view of the encircled portion of the drip emitter shown in FIG. 10.

With reference to FIGS. 9-11, the valve 40 is preferably a check valve, or other one-way directional valve, and is positioned between the first inlet 16 and the inlet end 44 of the tortuous path flow channel 38. The valve 40 is open and permits water flow between the first inlet 16 and the emitter outlet 22 when the supply water pressure is above a predetermined minimum level, such as 5 psi. The valve 40, however, closes off the flow path through the emitter 10 when the water pressure falls below the predetermined minimum level, as may occur when an irrigation cycle is completed. Closing the flow path through the emitter 10 prevents the water in the irrigation supply tube 100 from slowly draining to the outside through the emitter 10 and prevents backflow from entering the tube 100 from the emitter 10. Closing the flow path also prevents back siphoning into the emitter 10, i.e., closing the flow path prevents dirt and debris from outside terrain from entering and clogging the emitter 10.

As shown in FIGS. 9-11, the valve 40 includes a tubular or cylindrical portion i.e., a boss 48, of the diaphragm 36 seated on top of a substantially conical frustum portion 49 of the diaphragm 36. The boss 48 is spaced downstream of the first inlet 16 and is hollow, defining a hole 46 in the diaphragm 36. The boss 48 sealingly engages the upper housing 30 to block the flow path through the emitter 10 and, as shown in FIG. 11, disengages from the upper housing 30 to open the flow path and allow water to flow into the inlet end 44 and tortuous path flow channel 38. The inside surface of the upper housing 30 opposing the boss 48 includes a projecting disk 53 that is received in the opening 52 of the boss 48. The disk 53 assists in guiding and aligning the engagement between the boss 48 and the inside of the upper housing 30 to ensure an adequate sealing engagement.

More specifically, water flowing through the emitter 10 presses down on the pressure-sensitive and substantially conical frustum portion 49, or snap button 49, which, in turn, if the water pressure exceeds the predetermined minimum level, flexes, or "snaps down," causing the upper end 52 of the boss 48 to disengage from its sealing engagement with the upper housing 30 and thereby opening the flow path through the diaphragm hole 46, as shown in FIG. 11. If the water pressure does not exceed the predetermined level, the snap button 49 does not snap down, the upper end 42 of the boss 48 remains engaged to upper housing 30, and the flow path through the diaphragm hole 46 remains obstructed. Thus, the snap button 49 operates between two positions—a raised position, in which the boss 48 is sealingly engaged to the upper housing 30, and a lowered position, in which the boss 48 is disengaged from the upper housing 30.

In the preferred embodiment, the boss 48 is shown as seated atop the snap button 49. In alternative embodiments, the boss 48 need not be seated atop the snap button 49. Instead, the boss 48 may be located adjacent to the snap button 49, or may be otherwise operatively coupled to the snap button 49, such that when the snap button 49 flexes, or snaps down, in response to fluid pressure, the upper end 52 of the boss 48 disengages from a portion of the upper housing 30.

As shown in FIGS. 5 and 6, the lower housing 32 preferably includes a C-shaped rib 45 near the inlet end 44 of the tortuous path flow channel 38. The C-shaped rib 45 is located beneath the snap button 49 of the diaphragm 36 and prevents the valve 40 from being fixed in an open position. More specifically, as shown in FIG. 5, the C-shaped rib 45 projects away from the interior side of the lower housing 32 such that it comes into contact with the snap button 49 when the snap button 49 flexes downward in response to fluid pressure above the predetermined minimum level. The C-shaped rib 45 prevents the snap button 49 from flexing any further, thereby preventing the snap button 49 from becoming fixed in a lowered position and preventing the valve 40 from becoming fixed in an open position. Although, in the preferred embodiment, the supporting structure beneath the snap button 49 is in the form of a C-shaped rib 45, it should be evident that the supporting structure could be a differently shaped rib or a different supporting structure such as to prevent the valve 40 from becoming fixed in a lowered position.

Water flowing through the irrigation tube 100 enters the emitter 10 through the first inlet 16. It then enters a first chamber 58 defined, at least in part, by a portion of the upper housing 30, the boss 48, and the snap button 49. The boss 48 initially is in sealing engagement with a portion of the upper housing 30 to block the flow channel through the diaphragm hole 46. If the pressure of water flowing into the first chamber 58 and impacting the snap button 49 is below a predetermined minimum level, the boss 48 remains in sealing engagement with the upper housing 30, which, in effect, acts as a valve seat. If, however, the pressure of water flowing into the first chamber 58 and impacting the snap button 49 is above the minimum level, the upper end 52 of the boss 48 disengages from the upper housing 30, thereby opening the flow channel through the diaphragm hole 46.

Water then flows through the hole 46 in the diaphragm 36 to the inlet end 44 of the tortuous path flow channel 38. The water then experiences multiple directional changes as it is constantly redirected by the flow-diverting ribs 60 defining the tortuous path flow. This repeated redirection significantly reduces the water pressure and water flow by the time the water reaches the outlet end 54 of the tortuous path flow channel 38. The water then flows through the water metering chamber 41, as described further below. Next, the water proceeds through the emitter outlet 22, though the outlet bath 34 (defined by the region between the base 20 and the inside surface 110 of the irrigation tube 100), and out through the supply tube outlet 120 (an opening defined by the tube wall 110 and the I-shaped cross-section of the chimney 26). The water exits through the supply tube outlet 120 to the terrain and vegetation outside the tube 100. Once an irrigation cycle is complete, or if the water pressure in the irrigation tube 100 otherwise falls below the predetermined minimum level, the boss 48 in the diaphragm 36 returns to it relaxed state, closing valve 40 and creating a seal to prevent drainage and back siphoning through the emitter 10.

The water metering surface 42 is shown in FIGS. 5, 6, 9, and 10. The water metering surface 42 is formed in the lower housing 32 and is generally circular in shape when viewed from the upper housing 30. It is located downstream of the outlet end 54 of the tortuous flow path channel 38 and is upstream of the emitter outlet 22. As shown in FIG. 6, the water metering surface 42 includes a groove 43 formed therein for regulating water flow to the emitter outlet 22.

The water metering surface 42 is part of a pressure compensation mechanism for the emitter 10. Water initially flows through the second inlet 18 and accumulates in a pressure compensation chamber 62 (FIG. 10). The chamber 62 is defined by the upper housing 30 and the circular second end 56 of the flexible diaphragm 36 that overlays the water metering surface 42. Water flowing into pressure compensation chamber 62 accumulates in the chamber and does not flow through the rest of the emitter 10. In other words, the pressure compensation chamber 62 is sealed from the rest of the emitter 10. As the water accumulates, the water in the chamber 62 changes pressure with the pressure of the water supply in the conduit 100 and presses down, accordingly, against the circular second end 56 of the flexible diaphragm 36, thereby flexing and deflecting the diaphragm 36 toward the water metering surface 42.

The water metering surface 42 and the overlaying diaphragm 36 form a water metering chamber 41, located beneath the pressure compensation chamber 62. During operation of the emitter 10, water pressure in the pressure compensation chamber 62 causes the diaphragm 36 to flex between a fully relaxed position and a fully distended position, changing the size of the water metering chamber 41. In turn, this change in size of chamber 41 regulates water flow. More specifically, when the diaphragm 36 is in a fully relaxed position, the water metering chamber 41 is relatively large in size, allowing a relatively large fluid flow through the chamber 41. In contrast, when the diaphragm 36 is fully distended, the water metering chamber 41 is relatively small in size, allowing a relatively small fluid flow through the chamber 41. Thus, fluid flow through the water metering chamber 41 is reduced in general proportion to the amount of pressure exerted against the circular second end 56 of the diaphragm 36.

Further, the water metering surface 42 includes a groove 43 for regulating fluid flow. As shown in FIG. 6, the groove 43 has a depressed annular portion 55 that extends about the circumference of the water metering surface 42 and a depressed radial portion 57 connecting a point along the annular portion 55 to the emitter outlet 22. When the diaphragm 36 is fully distended by relatively high pressure, it is deflected into and presses against the water metering surface 42. The groove 43 provides a flow path along the depressed annular portion 55 to the depressed radial portion 57 and out through the emitter outlet 22. The groove 43 allows output flow even at relatively high water pressure, such that deflection of the diaphragm 36 does not completely obstruct fluid flow through the water metering chamber 41. Thus, the diaphragm 36, water metering chamber 41, water metering surface 42, and groove 43 act as a pressure-dependent mechanism to offset fluctuations in water pressure in the irrigation tube 100 to maintain the flow rate through the emitter 10 at a relatively constant level.

The use of the flexible diaphragm 36 and the groove 43 also permit the flushing of debris and grit out of the emitter 10. If grit or debris becomes lodged in the flow channel of the groove 43, water pressure in the groove will increase. When the pressure reaches a certain level, the flexibility of the diaphragm 36 allows it to be pushed upward, thereby dislodging the debris.

Figure 12:
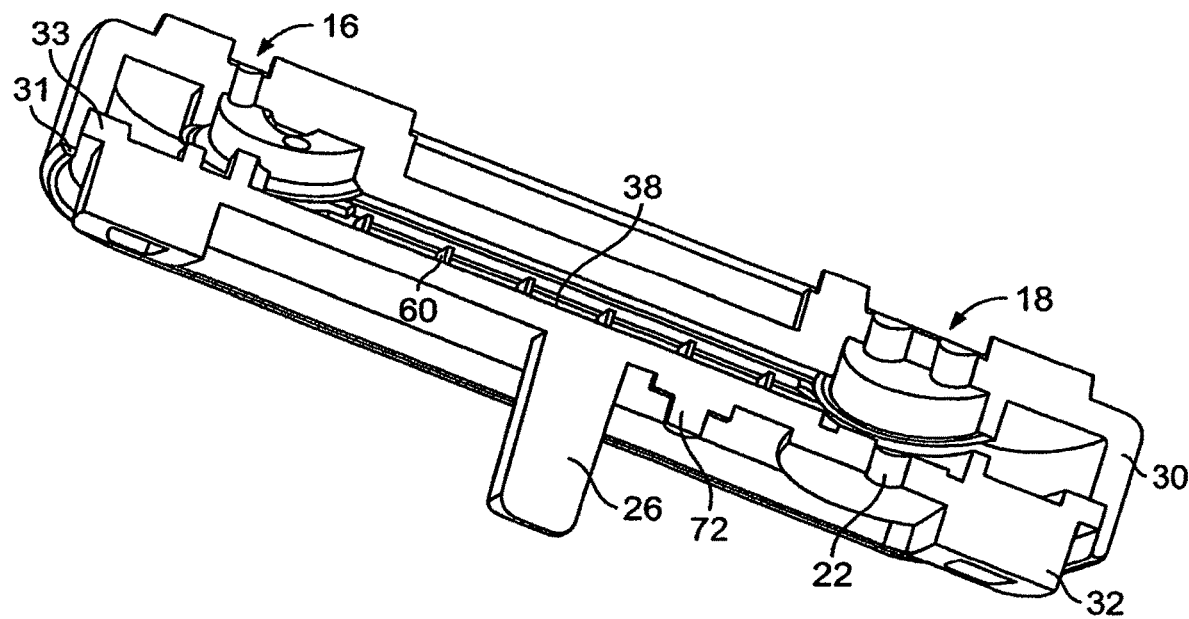
FIG. 12 is a perspective view of portions of an alternate upper housing and lower housing embodying features of the present invention.

As should be evident, numerous variations in the upper housing 30 and lower housing 32 are available to assure ease of assembly and ease of mounting the emitter 10 to the inside wall 110 of the supply tube 100. For example, as shown in FIG. 12, the upper housing 30 preferably includes a flange 31 that extends about the perimeter of the upper housing 30, and the lower housing 32 preferably includes a lip 33 that projects outwardly and defines the perimeter of the lower housing 32. The flange 31 and lip 33 engage one another to hold the upper housing 30 and the lower housing 32 securely together. More specifically, the flange 31 of the upper housing 30 is preferably fused to the lip 33 of the lower housing 32, such as by melting or by other coupling methods, to hold the two housing pieces securely in place.

Figure 13:
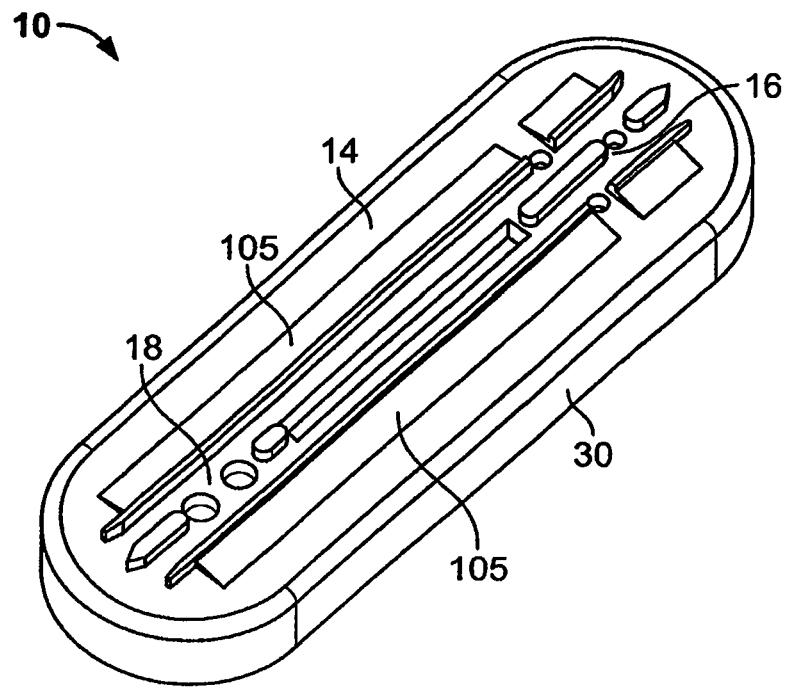
FIG. 13 is a top perspective view of the drip emitter of FIG. 1 with guide ribs for mounting the drip emitter.

In addition, as shown in FIG. 13, the upper housing 30 preferably includes features to assist in mounting the emitter 10. More specifically, the upper housing 30 preferably includes two guide ribs 105 for mounting each emitter 10 to the inside wall 110 of the supply tube 100. As shown, these guide ribs 105 project from the upper housing 30 and preferably extend longitudinally near the center of the upper housing 30, although other orientations and arrangements of guide ribs may be used. During assembly, each emitter 10 is mounted to the inside wall 110 of tube 100, as shown in FIG. 3. More specifically, an insertion device (not shown) presses against the upper housing 30 of each emitter 10 such that the lower housing 32 of the emitter 10 engages the inside wall 110. The guide ribs 105 provide stability and maintain proper orientation of the emitter 10 during mounting of the emitter 10 by engaging corresponding ribs of the insertion device.

As shown in FIGS. 14-18, a copper member 64 is preferably used at the emitter outlet 22 to prevent plant root intrusion. Use of copper is effective because, although copper is a required nutrient for plant growth, excessive amounts of copper inhibit root cell elongation. When a plant root comes into contact with copper, the surface of the root is damaged, the root hairs die off, and the overall growth of the root is stunted. The copper, however, does not cause any serious damage to the plant itself. Because the copper remains in the plant's root tissue, it only inhibits growth of the roots in close proximity to the copper and does not affect the overall health of the plant.

The interaction between copper and plant roots is used to protect the emitter 10 from root intrusion and obstruction of the emitter outlet 22. A copper member 64 is located in front of the emitter outlet 22 in order to inhibit root growth into the outlet 22. The amount of copper that is taken up by plant roots is infinitesimal, and therefore, the life of the copper member 64 is extremely long.

Figure 14:
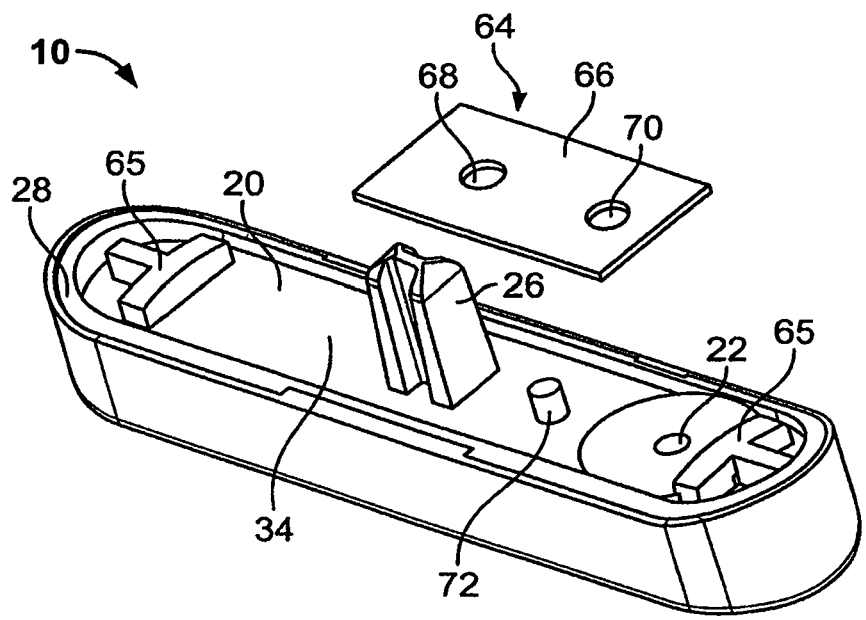
FIG. 14 is a perspective view of the drip emitter of FIG. 1 without the outlet shield being mounted to the drip emitter.
Figure 15:
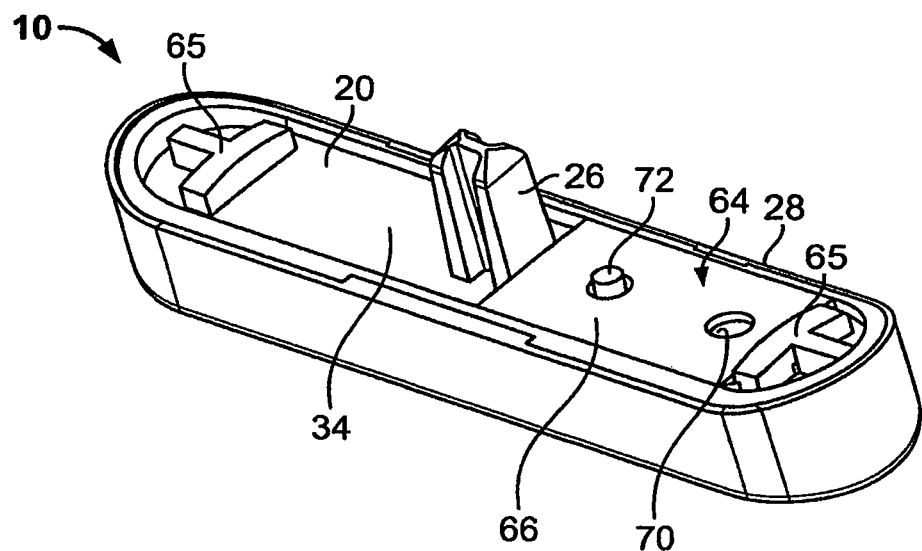
FIG. 15 is a perspective view of the drip emitter of FIG. 1 with the outlet shield being mounted to the drip emitter.

One cost effective form of a copper member 64, shown in FIGS. 14 and 15, is a thin rectangular copper plate 66 having two holes 68 and 70 therethrough. The copper plate 66 is preferably compression fitted to the base 20 of the emitter 10, such that the base 20 holds the copper plate 66 in place. The first hole 68 also is preferably dimensioned to receive a locator peg 72 protruding from the base 20 of the emitter 10 to provide an additional mounting for the plate 66. The two holes 68 and 70 on the plate 66 are spaced such that, when the first hole 68 is positioned over the locator peg 72, the second hole 70 is situated over the emitter outlet 22. The copper plate 66 may be mounted to the base 20 of the emitter 10 in various ways, i.e., the copper plate 66 can be heat staked, glued, co-molded, or otherwise mounted to the base 20. Alternatively, part or all of the base 20 may be flashed with a thin protective copper layer about the emitter outlet 22.

Two T-shaped mounts 65 located at the ends of the base 20 also are preferably used in mounting the base 20 to the inner surface 110 of the irrigation tube 100. The T-shaped mounts 65 assist in securing the emitter 10 to the irrigation tube 100 and provide additional mounting support for the raised rim 28. The T-shaped mounts 65 also provide structural integrity to the emitter 10 for resisting forces exerted by water flowing in the irrigation tube 100 and forces exerted when a chimney 26 is used to create an opening in the tube wall 110. The T-shaped mounts 65 also may be used to provide support for the copper member 64 when the copper member 64 is compression fitted to the base 20. Although the mounts 65 are shown in FIGS. 14 and 15 as T-shaped, it should be evident that the mounts may have various other shapes, such as circular or L-shaped, that may be used in other embodiments for mounting the emitter 10 to the inner surface 110 of the irrigation tube 100.

Figure 16:
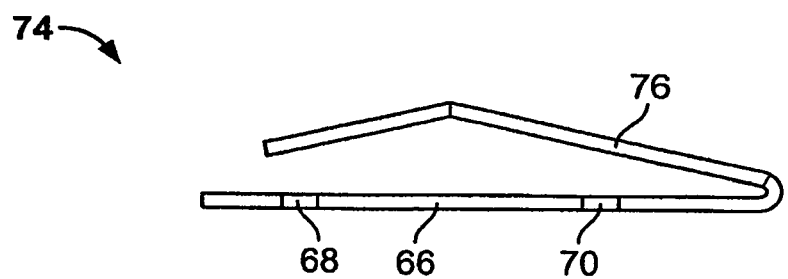
FIG. 16 is a side elevational view of an alternate outlet shield embodying features of the present invention.

The copper member 64 may take on other forms beside the copper plate 66. For instance, as shown in FIG. 16, a second form is a copper shield flap 74. The copper shield flap 74 preferably includes the rectangular copper plate 66 compression fitted to the emitter base 20, such as that shown in FIGS. 14 and 15, with two holes 68 and 70 therethrough, one of which fits over the locator peg 72 and the second of which fits over the emitter outlet 22 of FIGS. 14 and 15. As shown in FIG. 16, the copper plate 66 is folded over on itself to form a second layer 76 extending over the emitter outlet 22. This second layer 76 provides added protection to the emitter outlet 22 without affecting the water flow. It also acts as a physical barrier that protects the emitter outlet 22 from roots extending towards the emitter outlet 22.

Figure 17:
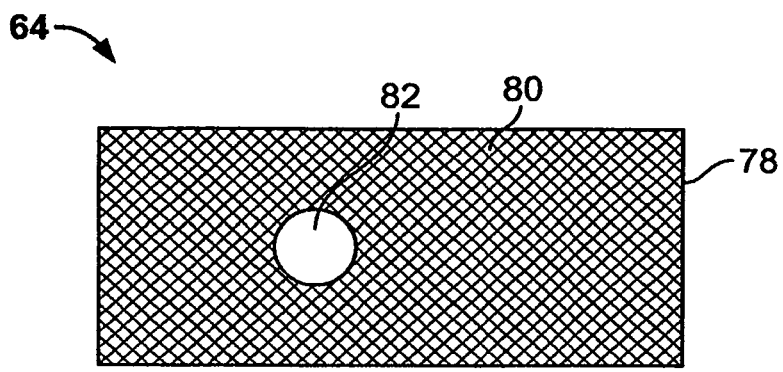
FIG. 17 is a top plan view of a second alternate outlet shield embodying features of the present invention.

Another form of the copper member 64 is the copper screen shield 78 shown in FIG. 17. The copper screen shield 78 is made up of woven copper strands 80 and has a hole 82 extending therethrough, as shown in FIG. 17, for positioning over the emitter outlet 22 shown in FIGS. 14 and 15. The mesh 80 forms a rectangular strip that is dimensioned to be mounted to the base 20 of the emitter 10 and to be mounted over the emitter outlet 22. One benefit of the copper screen shield 78 is that it is flexible and easy to mount about the outlets of certain emitters. Also, because of the many openings in the screen, there is increased copper surface area and, therefore, potentially more copper that may be taken up by an intruding plant root.

Figure 18:
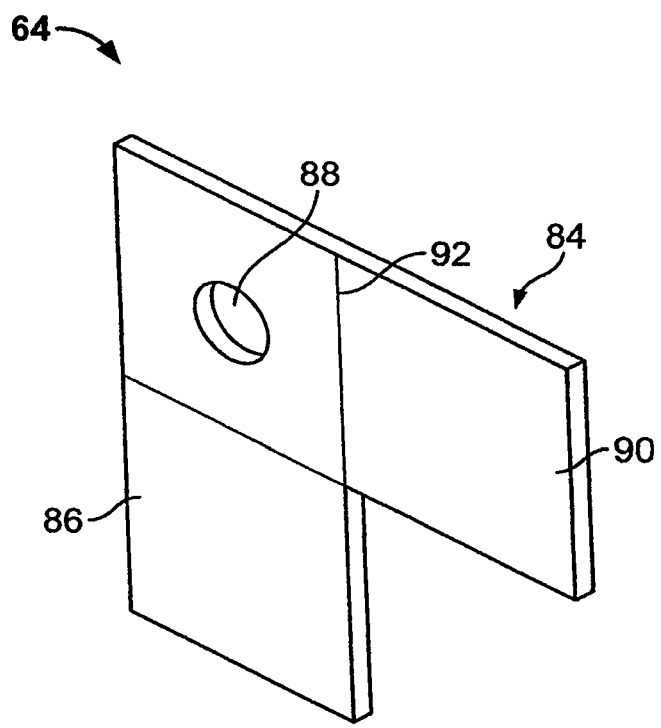
FIG. 18 is a perspective view of a third alternate outlet shield embodying features of the present invention.

A fourth form of the copper member 64 is the copper shield L-flap 84 shown in FIG. 18. One portion of the copper shield L-flap 84 is a rectangular strip 86 with a hole 88 therethrough that is mounted in abutting engagement to the base 20 of the emitter 10. A second portion of the copper shield L-flap 84 is a foldable square portion 90 that is folded over the rectangular strip 86, along the fold line 92. The strip 86 is mounted so that the hole 88 is positioned over the emitter outlet 22, allowing water to flow through the hole 88 of the strip 86. When folded, the folded portion 90 is not in abutting engagement with the strip 86 but, instead, forms a gap with the strip 86 so that water flow is not obstructed. The folded portion 90 extends outwardly above and in front of the emitter outlet 22, thereby providing added protection and acting as a physical barrier to root intrusion.

The preferred material for the member 64 consists of entirely, or almost entirely, copper. Copper alloy, including alloy containing 50% or more copper, may also be used to inhibit root intrusion. Alternatively, the member 64 may include non-copper and copper portions, such as a plastic core surrounded completely or in part by an outer copper layer. Further, as should be evident, the geometry, dimensions, and arrangement of such copper members 64 may vary depending on the specific shape and size of the subsurface drip emitter and its outlet and is not limited to the geometry of the embodiments shown in FIGS. 14-18.

One significant advantage of the copper member 64 is that the emitter outlets 22 are easily locatable. Subsurface drip emitters, made of plastic, silicone, and rubber components, and buried underground, are generally not readily locatable from above ground. By using copper at the emitter outlet 22 of each emitter 10, a metal detector can be used to easily locate the exact position of emitter outlets 22 in the drip irrigation tube 100 despite the fact that the tube 100 and emitters 10 are buried.

Moreover, copper installed in each emitter 10 can be located with a metal detector so that irrigation tubes 100 and emitters 10 can be easily located years after the system is installed. For example, this feature helps easily locate irrigation tubes 100 underground to prevent tube puncture that may result from the installation of aeration equipment, tent stakes, signs, etc. This feature also helps easily locate irrigation tubes 100 and emitters 10 underground to accomplish maintenance practices on the tubes 100 and emitters 10, such as replacing pieces of tubing, changing the layout of the irrigation system, and replacing old emitters with new emitters having different flow rates.

An additional advantage provided by the copper member 64 is that the protection against intruding plant roots is not affected by non-level terrain or relative orientation of the drip emitter 10. Chemicals used to prevent intruding roots may run off or otherwise become distributed unevenly where the terrain is not level or where the emitter 10 is oriented in a certain manner. In contrast, the emitter outlet 22 is protected by the copper member 64, which is affixed directly thereto, and such protection is not affected by the unevenness of the terrain or the orientation of the emitter 10.

Another significant advantage provided by the copper member 64 is that it does not seriously harm plants or detrimentally impact the environment. The copper taken up by a plant root has a localized effect on the root and does not harm the entire plant. Further, the above embodiments do not rely on the use of an herbicide to protect against plant root intrusion, which may have a significant and detrimental plant and environmental impact. Instead, the above embodiments prevent root intrusion in an environmentally friendly manner.

The foregoing relates to preferred exemplary embodiments of the invention. It is understood that other embodiments and variants are possible which lie within the spirit and scope of the invention as set forth in the following claims.

What is claimed is:

1. An irrigation system comprising:
    a supply tube having an interior which is capable of supplying fluid and having a wall defining a plurality of tube outlets extending therethrough;
    a plurality of drip emitters mounted to the wall within the interior of the supply tube, each drip emitter being associated with one of the plurality of tube outlets;
    at least one drip emitter comprising:
        a body defining an inlet and an emitter outlet downstream of the inlet, the inlet receiving fluid at a first pressure and the emitter outlet emitting fluid at a second pressure, the second pressure being less than the first pressure;
        a first flow path extending through the body from the inlet to the emitter outlet;
        a pressure reducing flow path defining a portion of the first flow path between the inlet and the emitter outlet;
        the body having a rim engaging the wall of the supply tube within the interior of the supply tube to form an outlet bath within the supply tube defined by a space between the body and the wall of the supply tube, the outlet bath being downstream of the emitter outlet and upstream of the associated tube outlet; and
        a copper containing metal piece separate from the body, the copper containing metal piece sized to fit in the outlet bath, disposed in a second flow path between the emitter outlet and the associated tube outlet, affixed to the body so as not to move relative to the body, and limiting root intrusion into the outlet bath;
        wherein the copper containing metal piece does not result in flow compensation due to its inability to move relative to the body.

2. The irrigation system of claim 1, wherein the copper containing metal piece of the at least one drip emitter is fixed against movement in the outlet bath at a position so as to maintain at least a portion of the copper containing metal piece at the emitter outlet.

3. The irrigation system of claim 1, wherein:
    the rim of the at least one drip emitter extends from the body about the perimeter of the outlet bath; and
    the rim being in sealing engagement with the wall of the supply tube within the interior of the supply tube to form the outlet bath.

4. The irrigation system of claim 1, wherein the copper containing metal piece of the at least one drip emitter is a copper containing metal plate.

5. The irrigation system of claim 1, wherein the at least one drip emitter further comprises a check valve upstream of the pressure reducing flow path.

6. The irrigation system of claim 1, wherein the copper containing piece is disposed in the outlet bath such that it defines at least in part the second flow path.

7. The irrigation system of claim 6, wherein a first portion of the copper containing piece engages the body in the outlet bath and the second flow path is defined by a second portion of the copper containing piece but not the first portion.

8. A drip emitter comprising:
    a body configured for mounting to an inner surface of a supply tube to define an outlet bath between the body and the inner surface;
    an inlet defined by the body and capable of receiving pressurized fluid from the supply tube;
    an emitter outlet downstream of the inlet, the inlet receiving fluid at a first pressure and the emitter outlet emitting fluid at a second pressure;
    a flow path from the inlet to the emitter outlet;
    a pressure reducing flow channel located in the flow path; and
    a copper containing metal piece separate from the body, the copper containing metal piece sized to fit in the outlet bath, disposed in a second flow path between the emitter outlet and the associated tube outlet, affixed to the body so as not to move relative to the body, and limiting root intrusion into the outlet bath;
    wherein the copper containing metal piece does not result in flow compensation due to its inability to move relative to the body.

9. The drip emitter of claim 8, wherein the metal structure is in the form of a plate with a copper outer surface.

10. The drip emitter of claim 8, wherein the copper metal is in the form of a layer of copper applied to a non-copper surface of the metal structure.

11. The drip emitter of claim 8, wherein the metal structure comprises a non-copper core surrounded at least in part by a copper layer.

12. The drip emitter of claim 8, wherein the metal structure is a metal layer with copper flashed to the body.

13. The drip emitter of claim 8 further comprising a check valve upstream of the pressure reducing flow channel.

* * * * *